United States Patent
Saucier

(10) Patent No.: US 12,414,883 B2
(45) Date of Patent: *Sep. 16, 2025

(54) MANUALLY FOLDABLE WHEELCHAIR RAMP

(71) Applicant: MPOWER MOBILITY, INC., Tarzana, CA (US)

(72) Inventor: Stanton David Saucier, Tarzana, CA (US)

(73) Assignee: MPOWER MOBILITY, INC., Moorpark, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/970,088

(22) Filed: Oct. 20, 2022

(65) Prior Publication Data

US 2023/0181393 A1 Jun. 15, 2023

Related U.S. Application Data

(63) Continuation of application No. 17/049,639, filed as application No. PCT/US2019/028991 on Apr. 24, 2019, now Pat. No. 11,491,059.

(Continued)

(51) Int. Cl.
*A61G 3/06* (2006.01)
*B60P 1/43* (2006.01)
*F16M 13/02* (2006.01)

(52) U.S. Cl.
CPC ............ *A61G 3/061* (2013.01); *B60P 1/43* (2013.01); *B60P 1/438* (2013.01); *F16M 13/022* (2013.01); *Y10S 414/134* (2013.01)

(58) Field of Classification Search
CPC . A61G 3/061; B60P 1/43; B60P 1/438; B60P 1/4485; F16M 11/045; F16M 11/048; F16M 13/022

(Continued)

(56) References Cited

U.S. PATENT DOCUMENTS

| | | | |
|---|---|---|---|
| 963,918 A | * | 7/1910 | Miller .................... B65G 69/30 414/537 |
| 4,966,516 A | | 10/1990 | Vartanian |

(Continued)

OTHER PUBLICATIONS

Ricon Corp, Oct. 7, 1999 Ricon Innovation in Mobility, Activan Accessibility With Style, Service Owner Manual.

(Continued)

*Primary Examiner* — James Keenan
(74) *Attorney, Agent, or Firm* — AP Patents; Alexander Pokot

(57) ABSTRACT

A ramp assembly comprises a support defining a vertical and horizontal pivot axes and a ramp with a first ramp portion coupled at one side thereof to the support, a second ramp portion, and a hinge connecting the second ramp portion to the first ramp portion. The second ramp section is manually movable between a generally folded stowed position being disposed in a surface-to-surface facing arrangement with the first ramp section and an unfolded deployed position being disposed in an end-to-end facing arrangement with the first ramp section. The ramp is manually pivotable on the support, about the vertical and horizontal pivot axes, between a folded stowed position, an unfolded deployed position defining an inclined ramp surface, and a folded intermediate position. The ramp can be installed on a vehicle for use by non-ambulatory passengers and be disposed in a position allowing unhindered use of the vehicle by ambulatory passengers.

13 Claims, 27 Drawing Sheets

Related U.S. Application Data

(60) Provisional application No. 62/662,310, filed on Apr. 25, 2018.

(58) Field of Classification Search
USPC .................. 14/71.1; 414/537, 921; 248/298.1
See application file for complete search history.

(56) References Cited

U.S. PATENT DOCUMENTS

| | | |
|---|---|---|
| 5,259,081 A | 11/1993 | Henderson |
| 5,795,125 A * | 8/1998 | Walkden ................. B60P 1/431 |
| | | 414/537 |
| 5,871,329 A | 2/1999 | Tidrick et al. |
| 5,897,285 A * | 4/1999 | Wanderscheid ........ B60P 1/431 |
| | | 414/537 |
| 6,179,545 B1 | 1/2001 | Peterson, Jr. et al. |
| 6,343,908 B1 | 2/2002 | Oudsten et al. |
| 6,536,064 B1 * | 3/2003 | Swink ..................... B60P 1/431 |
| | | 414/537 |
| 8,832,890 B2 * | 9/2014 | Loftis .................... B65G 69/30 |
| | | 414/537 |
| 9,126,522 B1 * | 9/2015 | Perez ..................... B60P 1/433 |
| 10,422,150 B2 * | 9/2019 | Roy ...................... F16M 13/022 |
| 2001/0048870 A1 | 12/2001 | Lewis et al. |
| 2003/0007851 A1 | 1/2003 | Heigl et al. |
| 2008/0271266 A1 | 11/2008 | Johnson |
| 2009/0085370 A1 | 4/2009 | Bartel et al. |
| 2016/0243990 A1 | 8/2016 | Portney et al. |

OTHER PUBLICATIONS

Ricon Corp, Dec. 3, 2001 Ricon Innovation, FR 2000 Series Fold Over Ramp Low-Floor Vehicle Access Ramp for Neoplan.
BraunAbility, Life is a Moving Experience, Anywhere is possible.
Diversified Golf Cars, Ramp Wheelchair Shuttle.
Ricon Corp, Clearway Lift.
Ricon Activan, Illistrated Index of Non-Eom Vehicle Equipment Including Electrical and Pneumatic Circuit Diagrams Plus Diagnostic Flow Charts, May 10, 1999.
VME Fold Out Ramp.

* cited by examiner

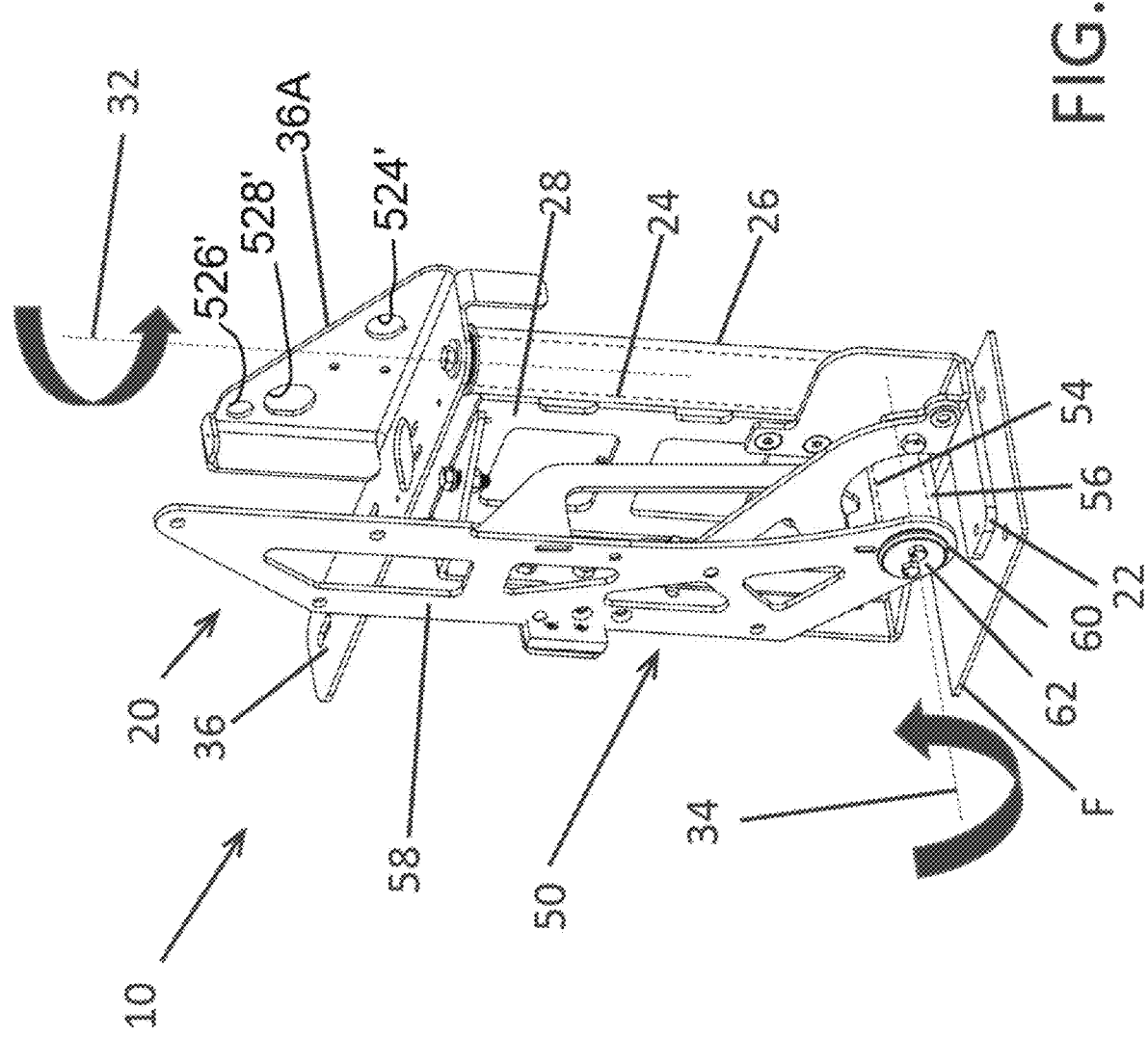

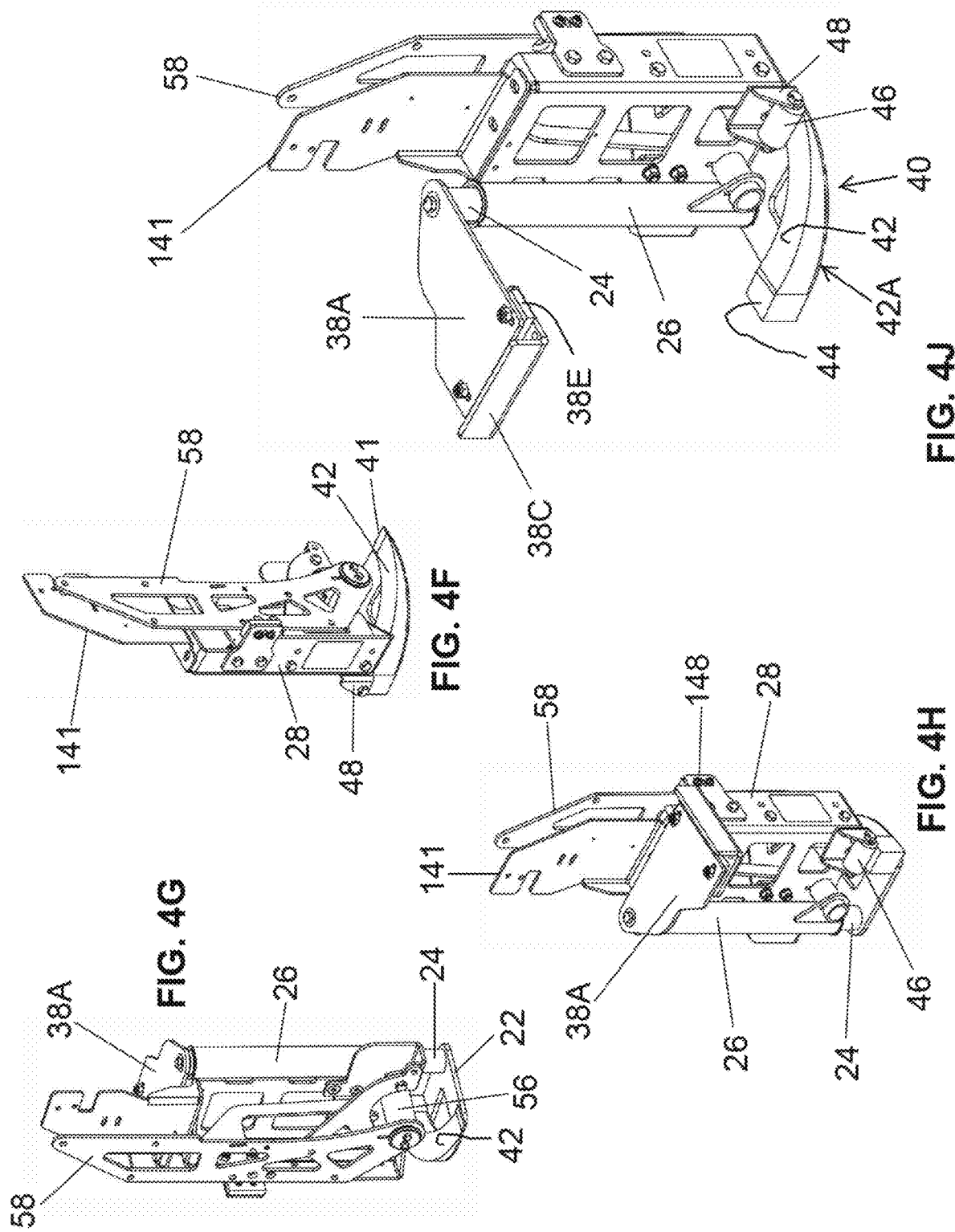

MANUALLY FOLDABLE WHEELCHAIR RAMP

CROSS-REFERENCE TO RELATED APPLICATIONS

This present nonprovisional application is a Continuation of a national stage application under 35 U.S.C. 371, now issued as US Reg Pat. No. 11,491,059 B2 on Nov. 8, 2021, which claims benefit of an international application Serial No. PCT/US2019/028991 filed on Apr. 24, 2019 and which claims benefit of priority from provisional U.S. patent application Ser. No. 62/662,310 filed on Apr. 25, 2018, the entire contents of which are hereby incorporated by reference thereto.

BACKGROUND

1. Technical Field

The subject matter relates to ramps for vehicles.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

Many different vehicle types are used to transport people and goods from place to place. Low speed vehicles such as, but not necessarily limited to, a golf car or a Club Car Transporter Model XLC (LSV) are frequently used in large facilities such, as hut not necessarily limited to, airports, hospitals, resorts and sports stadiums to quickly transport people and goods from one area to another. With the advent of the Americans with Disabilities Act and the corresponding aging of the "baby boomer" population, the need to transport ambulatory, partially able bodied as well as non-ambulatory wheelchair-bound passengers at such facilities is increasing.

Some vehicles employ ramps that are fixed to the side of the vehicle such that, when folded up and not in use, the ramp blocks access to ambulatory passengers from that side of the vehicle. Some vehicles employ motorized ramps that require a pocket in the deck structure. Some vehicles employ barrier(s) that are fixed at a side of the vehicle being opposite to the side of ramp deployment, thereby blocking access to the vehicle entirely from such opposite side.

There nonetheless remains room for improvement. There is at least a need for an improved vehicle that can be quickly and efficiently configured to transport able-bodied ambulatory passengers, semi-ambulatory passengers and/or non-ambulatory, wheelchair-bound passengers.

BRIEF DESCRIPTION OF THE DRAWINGS

The accompanying drawings are incorporated in and constitute part of the specification and illustrate various embodiments. In the drawings:

FIG. 4A illustrates a perspective view of an exemplary support member, employed for attachment of the ramp of FIGS. 1-3B to a rigid structure, with the ramp being illustrated in a folded stowed position;

FIGS. 4F-4J illustrate an exemplary ramp lifting assembly that can be used with the ramp of FIGS. 1-3B and support of FIGS. 4A-4E;

DETAILED DESCRIPTION OF EXEMPLARY EMBODIMENTS

Figure 1:
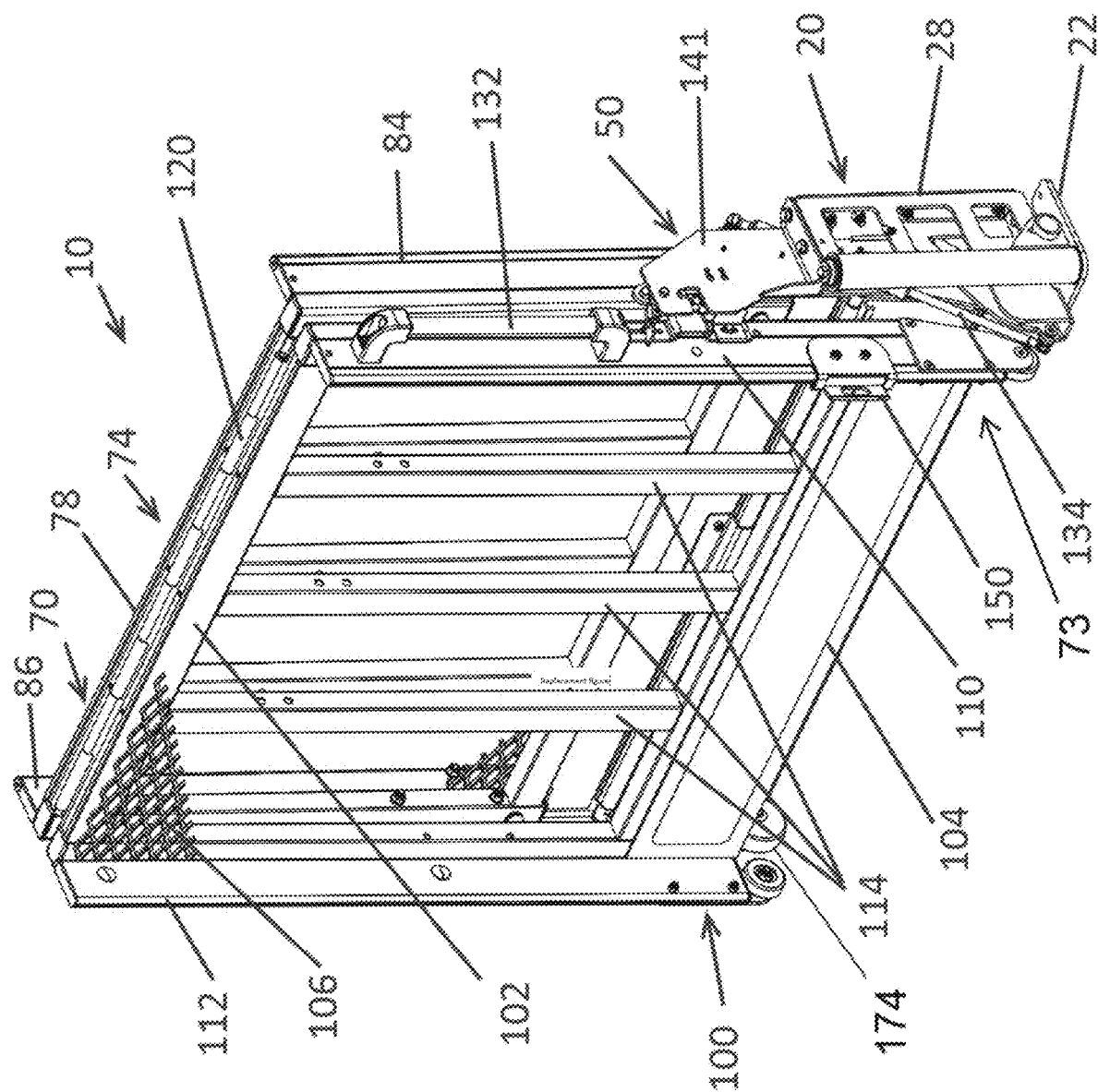
FIG. 1 illustrates a perspective view of an exemplary ramp assembly with a ramp being in a folded stowed or intermediate position.

Prior to proceeding to the more detailed description of the present subject matter, it should be noted that, for the sake of clarity and understanding, identical components which have identical functions have been identified with identical reference numerals throughout the several views illustrated in the drawing figures.

References in the specification to "an embodiment", "an example" and similar phrases mean that a particular feature, structure, or characteristic described in connection with the embodiment or variation, is included in at least an embodiment or variation of the invention. The phrase "in an embodiment", "in an example" or similar phrases, as used in various places in the specification, are not necessarily meant to refer to the same embodiment or the same variation.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The term "couple" or "coupled" when used in this specification and appended claims refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

It is to be understood that the singular forms "a," "an," and "the" include plural referents unless the context clearly dictates otherwise. Thus, for example, reference to "a component surface" includes reference to one or more of such surfaces.

The particular embodiments generally provide apparatuses, systems and methods directed to wheelchair ramps for vehicles. In examples, such vehicle can comprise a low speed vehicle (LSV), for example such as a golf club, a club car transporter or a utility (terrain) vehicle (UTV). The ramp is generally folded and disposed in a stowed position within a cavity of the vehicle. In LSV, such cavity is generally defined as a space between the front seat and at least one rear seat. In UTV, such cavity can be defined as a space between a steering wheel and a rear cabin wall or partition. In other words, it is contemplated herewithin that the UTV may not have a conventional seat. The ramp is manually pivoted on a support and manually unfolded to provide an inclined ramp surface between a deck surface of the vehicle and a ground for wheelchairs and passengers to ingress or egress the vehicle. The ramp is manually folded and manually pivoted either into the storage (stowed) position and/or intermediate position along one edge of the vehicle. An optional barrier can be also provided to partially close an opposite side (off-side) of the cavity opening when the ramp is in use. When the ramp is stowed within the cavity of the vehicle, the barrier is manually pivoted into a position being generally coplanar to a stowed position of the ramp. Optional wheelchair restraint(s) can be also provided to at least prevent if not completely eliminate wheelchair motion during vehicle movement. When in the stowed position, the ramp does not obstruct able-bodied passengers from using the cavity. Thus, the ramp assembly solves a problem quickly and efficiently configuring the vehicle for use by ambulatory able-body passengers, semi-ambulatory passengers who may require assist of a walker and non-ambulator, wheelchair-bound passengers.

The particular embodiments of the present disclosure generally provide apparatuses, systems and methods directed to ramps for vehicles, for example such as a minivan, a full-size van, a recreational vehicle, or a bus. The vehicle generally comprises a vehicle body including a floor, a passenger side and a driver side, an opening formed in at least one of the passenger and driver sides, the vehicle body defining a vehicle cabin accessible by the opening, the vehicle cabin having a front seat positioned in a front seat area and a rear seat positioned in a rear seat area contained therein. The ramp is mounted in a stowed position within the cabin adjacent the opening. The ramp is manually pivoted on a support from the stowed position and is manually unfolded to provide an inclined ramp between a floor surface of the vehicle and a ground for wheelchairs and passengers to ingress or egress the vehicle. The ramp is manually folded and manually pivoted either into the stowed position and/or intermediate position along one edge of the vehicle. When in the stowed position, the ramp does not obstruct able-bodied or ambulatory passengers from using the cabin. Thus, the ramp assembly solves a problem quickly and efficiently configuring the vehicle for use by ambulatory able-body passengers, semi-ambulatory passengers who may require assist of a walker and non-ambulator, wheelchair-bound passengers.

In particular embodiments, therein is provided a wheelchair accessible, vehicle conversion kit comprising a foldaway ramp, integrated offside barrier, kneeling suspension, integrated wheelchair restraints and control system interlocks.

In particular embodiments, a configuration/conversion of a vehicle is selectively enabled for transport of either or both able-bodied or wheelchair-bound passengers. Furthermore, the ability to accommodate either or both able-bodied or wheelchair-bound passengers in the same vehicle is achieved with a minimal operator training. The ramp pivots behind the front seat(s) and out of the normal passenger opening up when not in use, thus providing unhindered access by able-bodied passengers. An optional offside (side opposite the side of ramp deployment) barrier can be used, when the offside of the vehicle is at least partially open, to prevent the inadvertent, rolling off of the passenger deck by wheelchair-bound passengers and can be optionally both mechanically and electrically interlocked to minimize the possibility of exposing a wheelchair passenger to an open off side. The barrier, when provided, stores (stows) over the stowed folded ramp such that the barrier must be deployed before the folded ramp can be deployed and unfolded. An optional interlock can be provided such that in the event the ramp is being deployed when the offside barrier is not completely deployed, the operator will receive an alarm. The converted vehicle does not necessarily require any sacrifice of the available seating. The optional kneeling system can be combined with a longer and wider ramp and provides unprecedented wheelchair access. The additional width and lower entry slope make it possible to load either powered or manually operated wheelchairs with minimal effort.

In particular embodiments, a ramp and an offside barrier can be stowed, within a cavity of the vehicle when not in use by pivoting out of the normal entry ways so that vehicle access by ambulatory passengers is uninhibited. Further, the offside barrier can be mechanically interlocked with the ramp such that the offside barrier must be at least partially deployed before the ramp can be pivoted into the vehicle entry way or side opening. Finally, an optional control circuit can be configured so as to further interlock the barrier with ramp such that one or both of an audible annunciation and a visual annunciation are provided to the operator of the vehicle in the event that the offside barrier is not completely deployed when the ramp is deployed and unfolded. It is to be understood that terms "completely deployed" or "fully deployed" mean herein that the barrier is in its final position and mechanically restrained or latched to prevent unintended movement In particular embodiments, a vehicle can be adapted with a kneeling suspension to significantly reduce the ramp slope or incline. Though the kneeling actuator within the kneeling suspension can be equipped with a significant gear reduction and, thereby would move a bit slow, the kneeling suspension still returns the vehicle to a normal ride height in a time it takes an operator of the vehicle to manually fold the ramp and move to the driver's seat. Accordingly, there is no "waiting" for the system to recover to execute normal operation.

In particular embodiments, optional integrated wheelchair restraint(s) can be used without requiring separate, on board vehicle storage for the main retractor components.

In particular embodiments, an optional interlock can disable the wheelchair restraints when the ramp is not deployed. A further interlock can disable the vehicle when the ramp is not stowed.

In particular embodiments, an extension member or post on the top, aft portion of the offside barrier mechanically prevents the wheelchair ramp from being folded and stowed out of sequence, further reducing the possibility for operator error that may result in an unsafe condition for wheelchair bound users.

In particular embodiment, when the ramp is deployed and unfolded, the slop of the ramp surface meets applicable ADA requirements.

In at least one embodiment, therein is provided a support and a ramp coupled to the support. The support can be configured to mount either to a horizontal surface/structure or to a vertical surface/structure. In any configuration, the ramp is coupled to the support so that the ramp can pivot on the support about a horizontal axis and a vertical axis. The ramp is pivotally movable on the support between a generally vertical folded stowed position, a deployed unfolded position defining an inclined ramp surface and a generally vertical folded intermediate position.

It is to be understood that in an embodiment many components of the ramp assembly are manufactured from metal, for example such as a steel, an aluminum and a combination thereof. In this embodiment, such components can be coupled, either directly or indirectly, therebetween by either a fastening method comprising use of fasteners, through apertures and threaded apertures and/or by a welding method. The detail description of the attachment of one component to another will be omitted in this document for the sake of brevity. The term "couple" can be also replaced by term "rigidly secured" or "rigidly attached" in this document.

Now in a reference to FIGS. 1-4J, therein is illustrated an exemplary manually operable ramp assembly 10. The ramp assembly 10 comprises a support 20 and a ramp 70. The illustrative support 20 is configured to mount to a horizontal surface/structure. The ramp 70 is coupled to the support 20 so that the ramp 70 pivots on the support 20 about a vertical axis 32 and a horizontal axis 34 between fully stowed, intermediate and fully deployed positions.

Figure 4B:
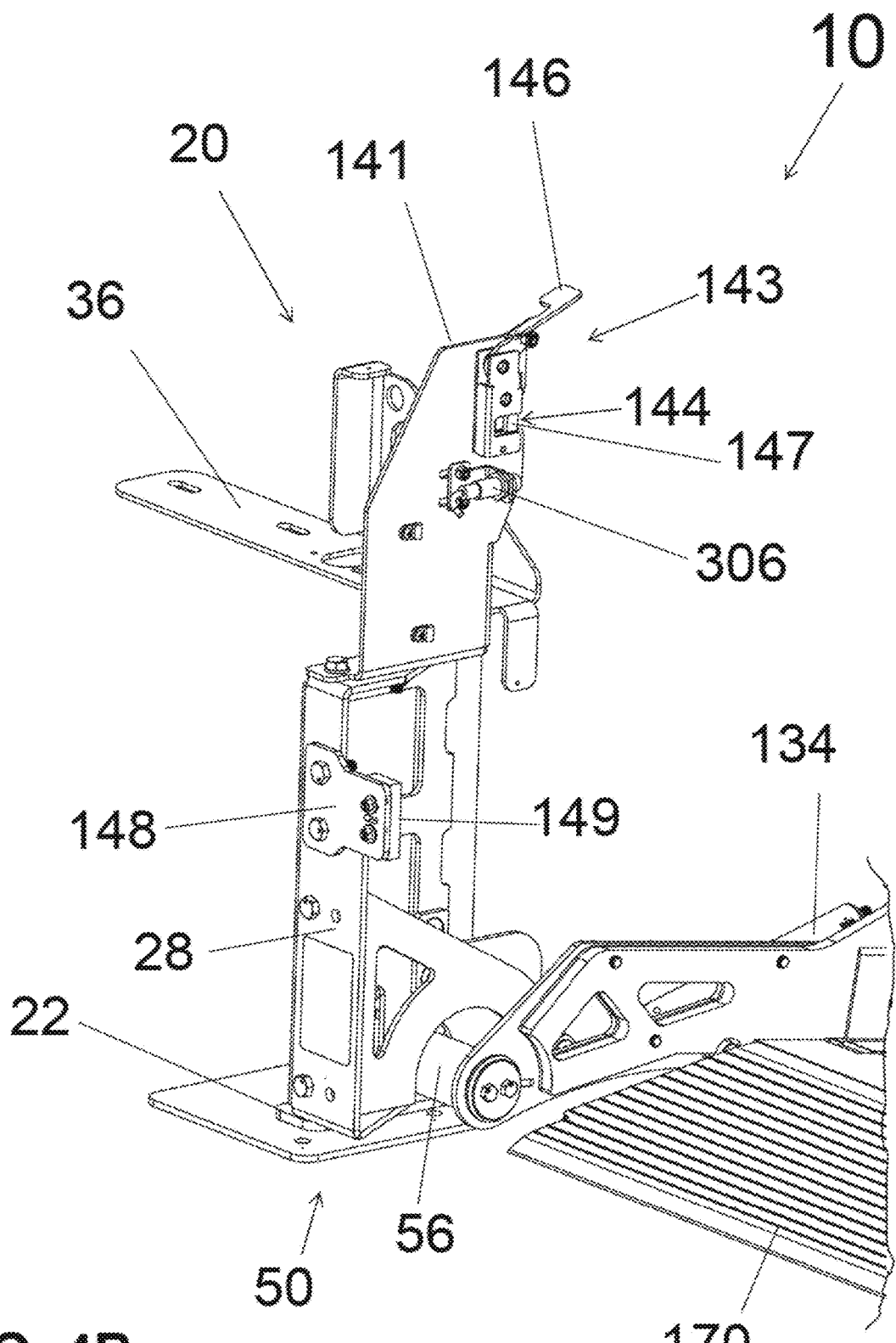
FIG. 4B illustrates a partial perspective view of the support member of FIG. 4A, with the partially illustrated ramp being in the unfolded deployed position.

An exemplary support 20 of FIGS. 4A-4B, comprises a mount 22 that is configured to be securely attached to a horizontal surface F. In an example of FIG. 4A, the mount 22 is illustrated as an L-shaped member. In an example of FIG. 4B, the mount 22 is illustrated as a plate-shaped member. The mount 22 can be provide in other shapes as well and can include flanges and/or curved surfaces. The support 20 also comprises a pivot member 24 that is rigidly secured at one end to the mount 22 and that upstands on the mount 22. The pivot member 24 defines the vertical axis 32. The pivot member 24 can be also referred to as a first pivot member 24 or a first pivot 24. A tubular member 26 envelops the pivot member 24 and is configured to pivot thereon about the vertical axis 32. A flange 28 is rigidly secured to the tubular member 26 for a pivoting therewith about the pivot member 24. The flange 28 can be provide as a solid member or can be adapted with through apertures or voids for weight saving considerations. The flange 28 can be provided as an L-shaped member. In a further reference to FIGS. 4A-4B, the support 20 can also comprise an optional mount 36 that would rigidly and securely couple the support 20 to a different structure than the surface F that the mount 22 attaches to. The optional mount 36 attaches to a stationary portion of the support 20, for example such as the pivot member 24. The support 20 can also comprise another optional mount 36A that can be also configured to rigidly and securely couple the support 20 to a different structure than the surface F that the mount 22 attaches to. The optional mounts 36 and 36A can be provided as a one-piece unitary member. The optional mounts 36 and/or 36A, when provided, rigidly secure the pivot member 24 at two opposite top and bottom ends thereof so that the pivot member 24 is generally maintained in an upright position during operation of the ramp assembly 10 while supporting at least a portion of the ramp 70.

Figure 4D:
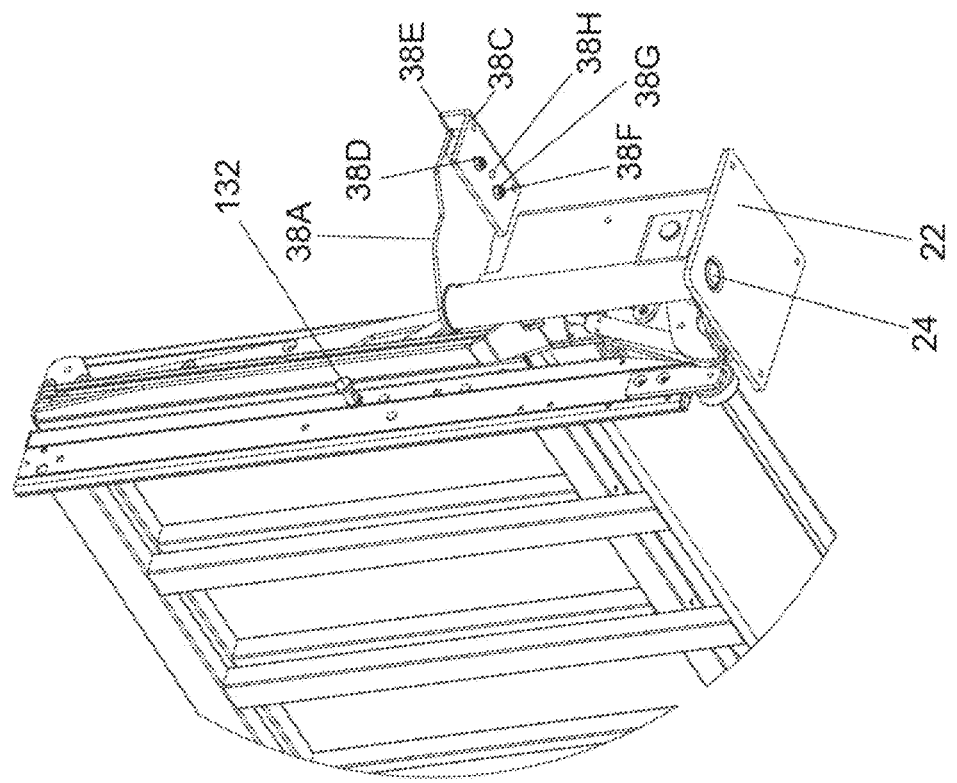
FIG. 4D illustrates a perspective view of a support member of FIG. 4C.
Figure 4C:
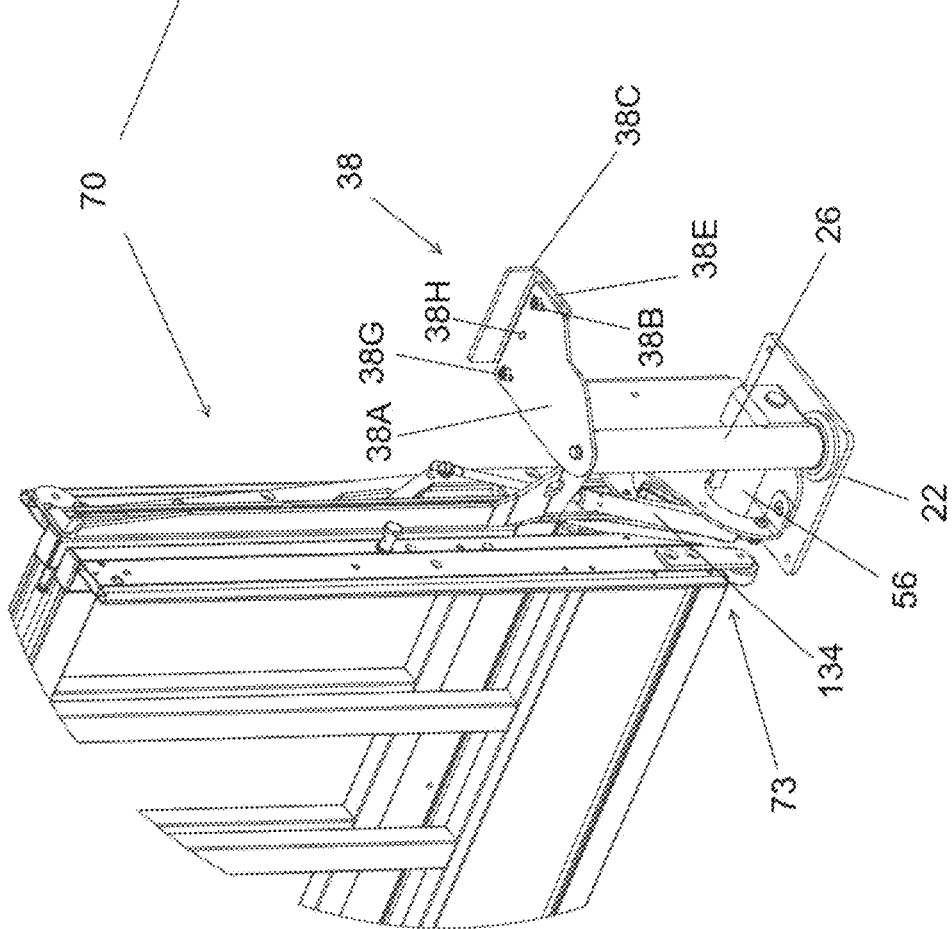
FIG. 4C illustrates a perspective view of an exemplary support member, employed for attachment of the (partially illustrated) ramp of FIGS. 1-3B to a rigid structure.

Now in a further reference to FIGS. 4C-4D, the support 20 can be adapted with an optional mount 38 configured to preload the top end of the pivot member 24 during operation of the ramp assembly 10. The optional mount 38 comprises a first member 38A that is rigidly secured to the top end of the pivot member 24. The first member 38A comprises elongated slot(s) 38B. The optional mount 38 also comprises a second member 38C. The second member 38C also comprises elongated slot(s) 38D. During operation of the ramp assembly 10, each elongated slot 38D is overlaid with the respective elongated slot 38B in a manner where a length thereof being oriented in a different direction than a length of the elongated slot 38D. In other words, during operation of the ramp assembly 10, the elongated slots 38B and 38D define a generally cross-shaped configuration. A third member 38D is disposed during use of the ramp assembly 10 between the first member 38A and the second member 38B. The third member 38D comprises threaded studs 38E that are pass through respective elongated slots 38B and 38E and protrude outwardly from the respective surfaces of the first member 38A and second member 38B. Threaded nuts 38G are employed to fasten the first member 38A to the second member 38B, essentially caging the third member 38D therebetween. The use of the optional mount 38 will be explained further in this document.

Figure 4E:
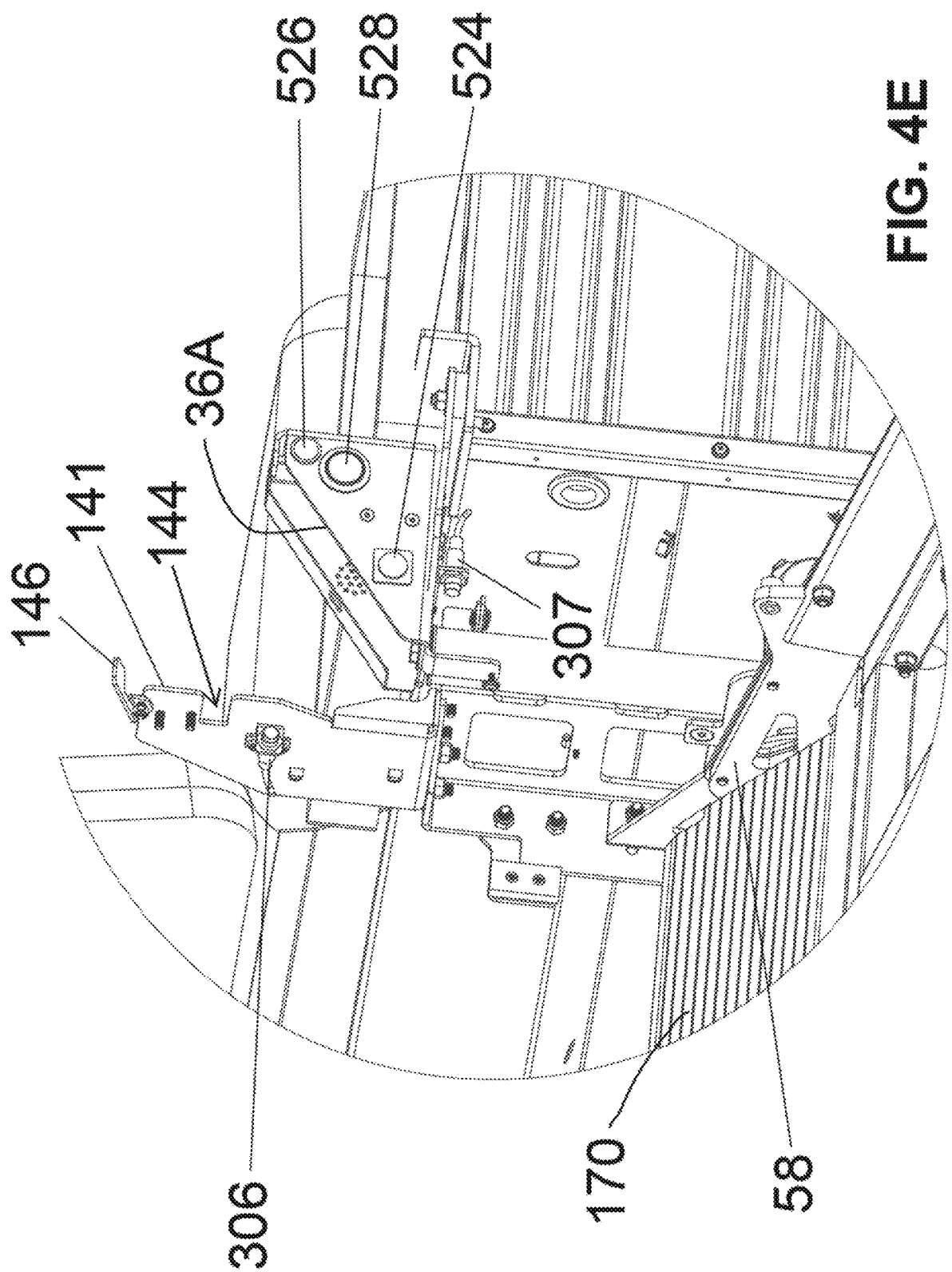
FIG. 4E illustrates a partial perspective view of the support member of FIGS. 4A-4D.

Now in a reference to FIG. 4E, the optional mount 36A can be also configured to mount optional accessories, for example such as a buzzer 524 through an aperture 524', an indicator light 526 through an aperture 526, a pushbutton 528 through an aperture 528', etc. The buzzer, 524, the indicator 526 and the pushbutton 528 can be accessible from an exterior surface of a cover 29.

Now in a reference to FIGS. 4F-4J, the support 20 can comprise an optional ramp lifting assembly 40. Such ramp lifting assembly 40, when provided, comprises an inclined curved surface 42 and a generally planar surface 42A. A generally planar surface 44 terminates the inclined curved surface 42 at a highest elevation thereof. A bracket 48 is rigidly secured to the flange 28 of the support 20, and a roller 46 rotationally supported by the bracket 48. The roller 46 has an exterior surface thereof rolling on the generally planar surface 44 and the inclined curved surface 42 during movement of the ramp 70 between the generally vertical folded stowed position and the generally vertical folded intermediate position. The ramp lifting assembly 40 can be provided without the optional mount 38, as is best illustrated in FIG. 4F, or can be provided in a combination with the optional mount 38, as is best illustrated in FIGS. 4G-4J. When the ramp lifting assembly 40 is provided, a length of the tubular member 26 is smaller than a length of the pivot member 24 so that the tubular member 26 can move linearly about the pivot member 24 in addition to pivoting about the vertical axis 32 defined by the pivot member 24. It is also contemplated that inclined curved surface 42 can be provided external to the support 20, for example being mounted on deck surface 212.

In any of the above examples, the support 20 also comprises a ramp bracket 50. The ramp bracket 50 is coupled to the flange 28. The ramp bracket 50 comprises a pivot member 54 that is rigidly secured at one end to the flange 28 and that is extended in a horizontal direction during operation, thus defining the horizontal axis 34. The pivot member 54 can be also referred to as a second pivot member 54 or a second pivot 54. A tubular member 56 envelops the pivot member 54 and is configured to pivot thereon about the horizontal axis 34 during use of the support 20. The ramp bracket 50 also comprises a ramp arm 58 that is rigidly attached at one end 60 thereof to the tubular member 56 for a pivoting motion therewith. The ramp arm 58 is prevented from axial disengagement from the pivot portion 54 by a washer 62. Although, it is also contemplated herewith that the ramp arm 58 can be mounted for the pivoting motion on the stationary portion without the use of the tubular member 56. In a non-limiting example, a thickness of the end 60 can be enlarged (relative to the remaining thickness of the ramp arm 58) to define a hub. AS it will be explained further in this document, the ramp arm 58 is configured to be rigidly secured to the ramp 70.

In a further reference to FIGS. 1-3B, The ramp 70 comprises a first ramp section 74. The first ramp section 74 has one end 76 thereof being configured to mount to the ramp arm 58 and, subsequently to the support 20, for a rotation about the vertical axis 32 and the horizontal axis 34. The first ramp section 74 also has an opposite end 78. The first ramp section 74 also has a first surface 80 that becomes a top surface when the ramp 70 is unfolded in a deployed position and a second surface 82 that is spaced apart from the first surface 80 to define a thickness of the first ramp section 74. The first ramp section 74 can be configured as a hollow frame member comprising the above described ends 76 and 78 and a pair of sides 84 and 86. The sides 84 and 86 are illustrated as extending outwardly from the top surface 82 to provide side safety rails during use of the ramp assembly 10. However, it is also contemplated that the sides 84 and 86 can be generally flush with the top surface 82. One or more optional reinforcing members 88 can be rigidly secured to either ends 76 and 78, as is illustrated, or alternatively to the sides 84 and 86 to increase rigidity and/or stiffness of the first ramp section 74 and essentially prevent it from sagging or twisting during use. The quantity and configuration of the reinforcing members 88 will generally depend on any one of a width of the ramp 70, a length of the ramp 70 in the deployed position, passenger weight with and without wheelchair. The first surface 80 can be provided as an illustrated meshed member secured to the ends 76, 78 and/or sides 84, 86. Alternatively, the top surface 80 can be provided as a solid member. The opposite surface 82 can be open. Furthermore, as illustrated in various figures, the sides 84, 86 can extend outwardly from the ends 76, 78, thus defining a U-shaped configuration of the first ramp section 74, best illustrated in FIGS. 1-2.

The ramp 70 also comprises a second ramp section 100 that has a pair of ends 102 and 104, a first surface 106 that becomes a top surface when the ramp 70 is unfolded and a second surface 108 that is spaced apart from the first surface 106 to define a thickness of the second ramp section 100. The second end 104 is configured to contact the ground surface when the ramp 70 is unfolded in the deployed position. The second ramp section 100 can be also configured as a hollow frame member comprising the above described ends 102 and 104 and a pair of sides 110 and 112. The sides 110 and 112 are illustrated as extending outwardly from the top surface 106 to provide side safety rails during use of the ramp assembly 10. However, it is also contemplated that the sides 110 and 112 can be generally flush with the top surface 106. One or more optional reinforcing members 114 can be rigidly secured to either ends 102 and 104, as is illustrated or alternatively to sides 110 and 112 to increase rigidity and/or stiffness of the second ramp section 100 and essentially prevent it from sagging or twisting during use. The quantity and configuration of the reinforcing members 114 will generally depend on any one of a width of the ramp 70, a length of the ramp 70 in the deployed position, passenger weight with and without wheelchair. The first surface 106 can be provided as an illustrated meshed member secured to the ends 102, 104 and/or sides 110, 112. Alternatively, the top surface 106 can be provided as a solid member. The opposite surface 108 can be open. Furthermore, as illustrated in various figures, the sides 110, 112 can extend outwardly from the ends 102, 104, thus defining a U-shaped configuration of the second ramp section 100, best illustrated in FIGS. 1-2. Since the second end 104 is configured to contact the ground surface when the ramp 70 is unfolded in the deployed position, such second end can be made large relative to the first end 102 to provide a solid stepping on surface.

Figure 2:
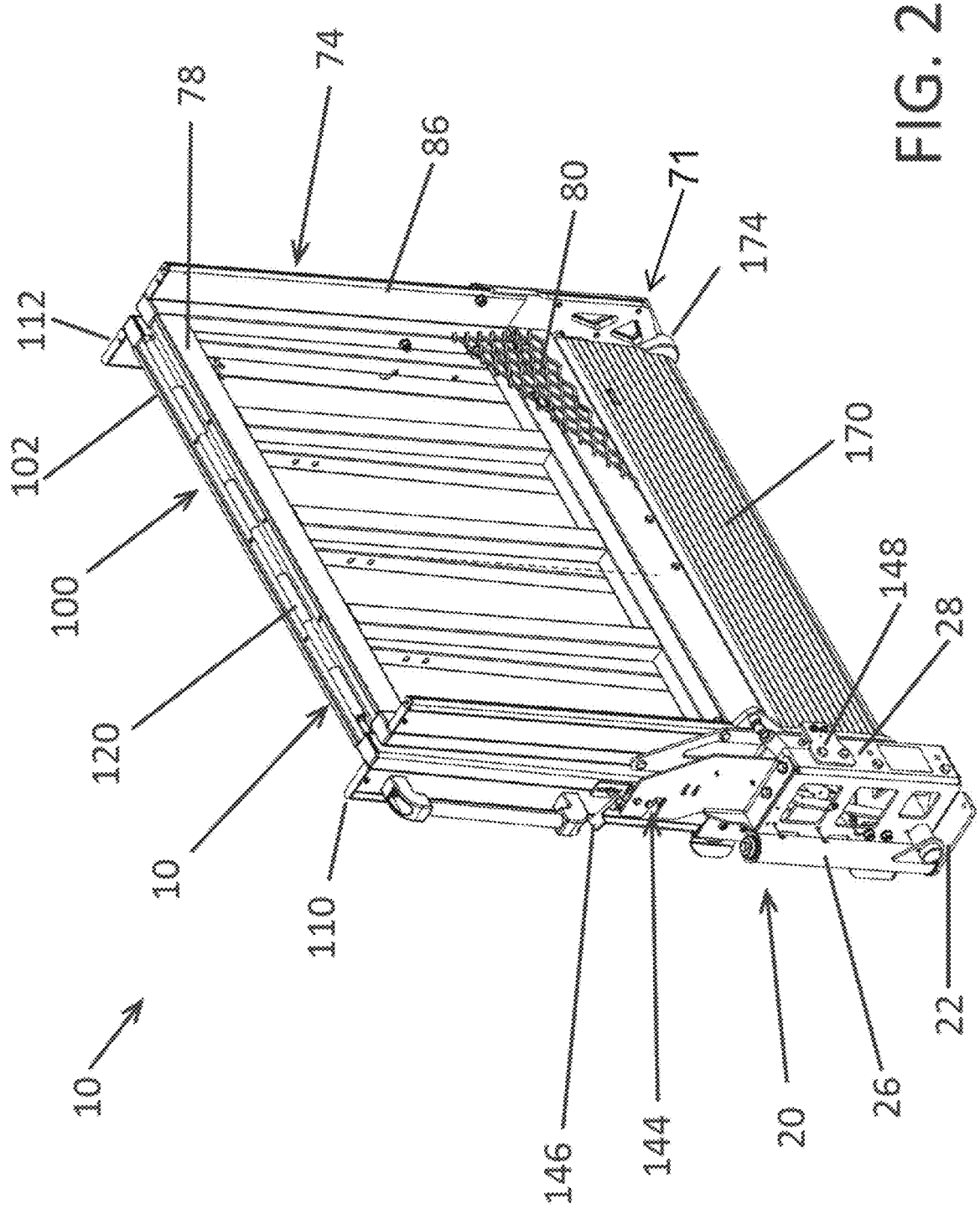
FIG. 2 illustrates another perspective view of the ramp assembly of FIG. 1.
Figure 3A:
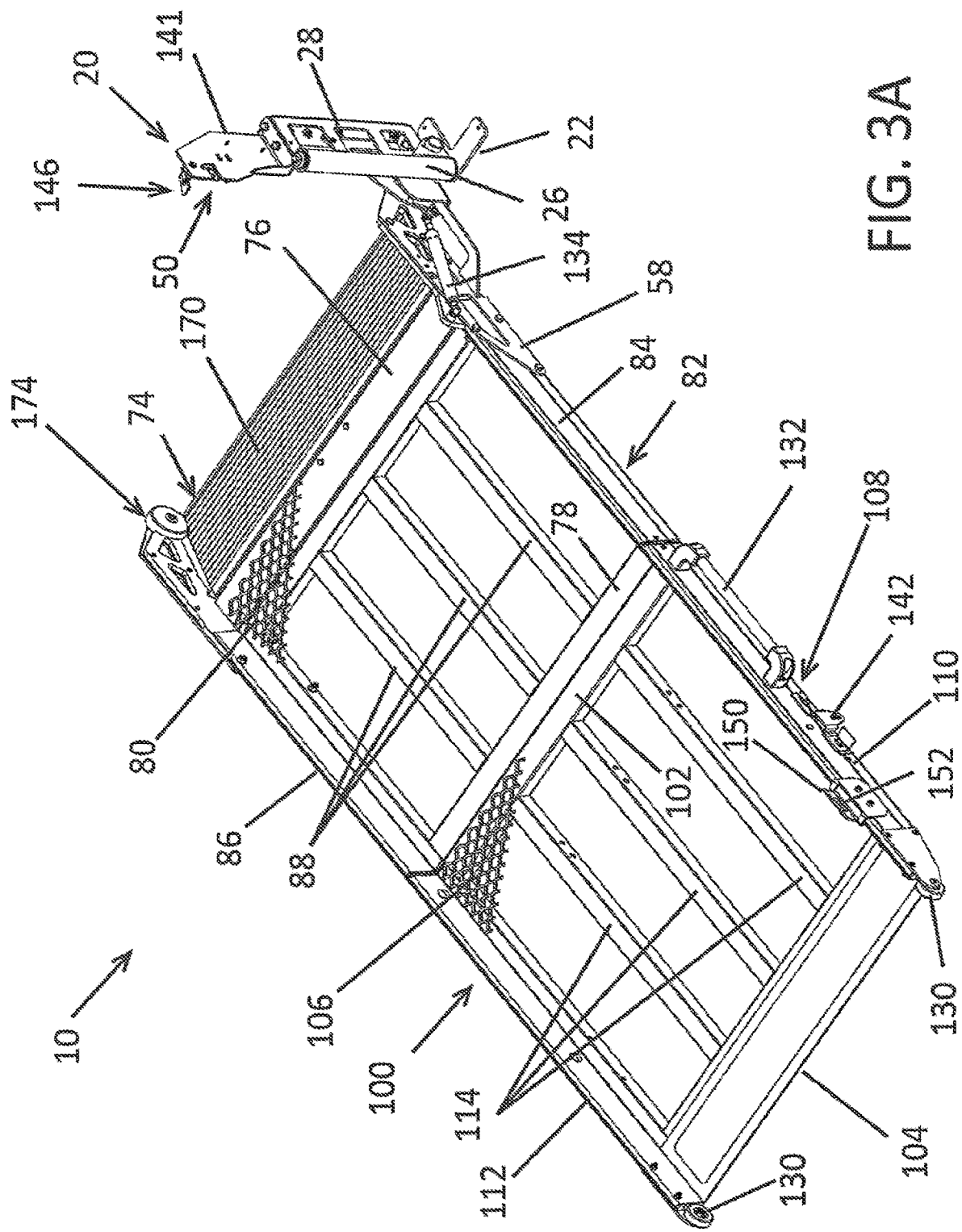
FIG. 3A illustrates a perspective view of the ramp assembly of FIGS. 1-2 with the ramp being in an unfolded deployed position.
Figure 3B:
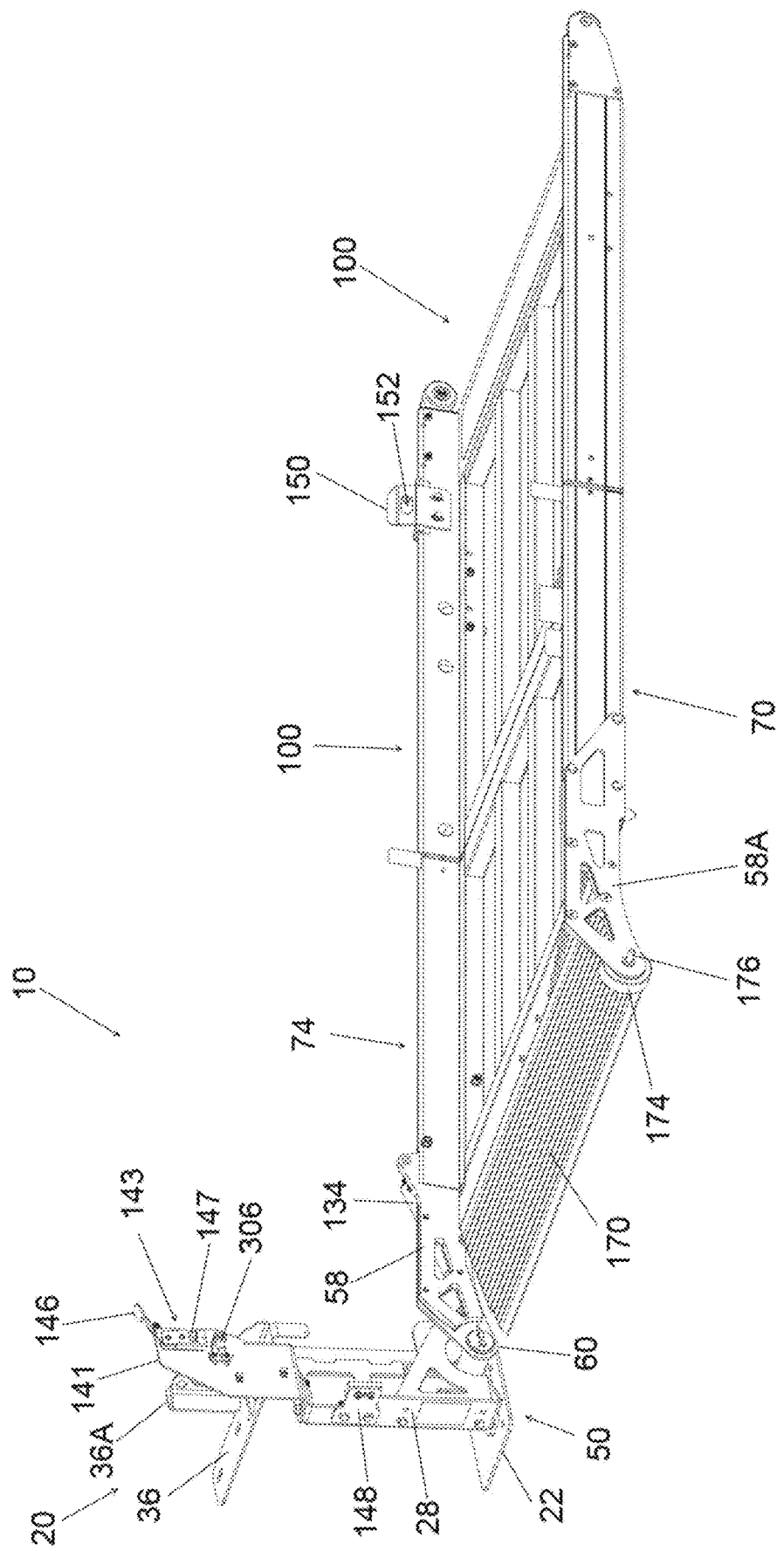
FIG. 3B illustrates another perspective view of the ramp assembly of FIGS. 1-2 with the ramp being in the unfolded deployed position.

The ramp 70 also comprises a hinge 120 that is configured to operatively couple the end 78 of the first ramp section 74 to the end 102 of the second ramp section 100. In an example, the hinge 120 can be a continuous hinge or can be provided in separate sections. In an example, a short hinge section can be mounted adjacent each side. In either example, the second ramp section 100 is movable between a generally folded stowed position being disposed in a surface-to-surface facing arrangement with the first ramp section 74, as is best illustrated in FIGS. 1-2 and a deployed unfolded position being disposed in an end-to-end facing arrangement with the first ramp section 74 and defining an inclined ramp surface during the operation of the ramp 70, as is best illustrated in FIGS. 3A-3B.

The above described ramp assembly 10 provides a cost-effective solution of (manually) configuring two different surfaces spaced apart from each other in a vertical direction between use by an ambulatory individual, by a semi-ambulatory or a limited mobility individual and by a non-ambulatory individual. The non-ambulatory individual may use a personal mobility vehicle (not shown). The limited mobility individual may use a conventional walker for support and/or may have difficulty of stepping up or down.

The above described ramp assembly 10 can be adapted with one or more of the following optional features.

A handle 132 can be attached to one side of the second ramp section 100, for example such as the side 110, for ease of pivoting the second ramp section 100 relative to the first ramp section 74 as well for ease of pivoting the ramp 70 about the axes 32 and 34.

A counterbalance device 134 can be provided to aid in a pivoting movement of the ramp 70 being an intermediate position and a fully deployed position as well as during pivoting of the second ramp section 100 away from and toward to the first ramp section 74. The counterbalance device 134 has one end thereof being coupled to the ramp bracket 50 and has a longitudinally opposite end thereof being coupled to the first ramp section 74. In a non-limiting example, the counterbalance device 134 is a spring-operated device, such as a shock absorber. In a non-limiting example, the counterbalance device 134 is a gas spring.

A latch assembly 140 can be provided to latch the ramp 70 to the support 20 in the intermediate and fully stowed positions. Such latch assembly 140 can generally comprise a ramp latch pin 142 that extends from one side of the second ramp section 100. The ramp latch pin 142 engages a ramp latch opening 144 within the latch bracket 141 of the ramp bracket 50 when the ramp 70 is latched to the ramp bracket 50 in the intermediate and the generally folded stowed position. The ramp latch opening 144 can be provided as a part of a latch assembly 143. A latch pin securing/release device 146 of the latch assembly 140, for example such as a pivoting lever, is mounted on the latch bracket 141 of the support 20 to latch and unlatch the ramp 70 in the intermediate and stowed positions. As is best shown in FIG. 4B, the lever 146 is connected to a rotary latch represented by a latch bar 147 so that when the lever 146 is pivoted in a clockwise direction in FIG. 4B, the latch bar 147 rotates outwardly and no longer protrudes into the latch opening 144, thus allowing the latch pin 142 to enter the latch opening 144 during latching operation or exit the latch opening 144 during unlatching operation. It is also contemplated that the lever 146 and the latch bar 147 can be configured so that the lever 146 pivots in a counter-clockwise direction.

A stop bracket 148 can be rigidly coupled to the flange 28 to prevent overtravel of the ramp 70 being rotated about the axis 34. A stop 149 can be secured to the stop bracket 148 to cushion movement of the ramp 70 and prevent a metal-to-metal contact. In a non-limiting example, the stop 149 can comprise an elastomeric material.

As has been stated above, the ramp assembly 10 at least provides a cost-effective solution of (manually) configuring two different surfaces spaced apart from each other in the vertical direction (i.e. at different elevations) for selective use between an ambulatory individual and a non-ambulatory or a limited mobility individual.

One of such two different surfaces can be a ground and the other surface can be a deck or floor of a vehicle.

Thus, in an exemplary embodiment, the above described ramp assembly 10 solves a problem of configuring or converting a vehicle for loading of ambulatory, non-ambulatory and semi-ambulatory, limited mobility individuals thereinto and unloading such individuals therefrom where the ramp assembly 10 is positionable so as to not hinder the ambulatory individuals from using a passenger compartment or cavity of the vehicle yet allowing quick reconfiguration of the vehicle for use by non-ambulatory and limited mobility individuals.

In other words, the above described ramp assembly 10 provides a cost-effective solution of configuring a vehicle for use by ambulatory, non-ambulatory and limited mobility individuals. It would be appreciated that the non-ambulatory individual can use a personal mobility vehicle (not shown). Such personal mobility vehicle (not shown) can be a wheelchair, either manually operated or powered.

In an embodiment, the vehicle can be provided as a door-less electric or a combustion-powered utility vehicle. Such door-less electric or the combustion-powered utility vehicle 200 can be referred to as a low speed vehicle (LSV). One non-limiting example of such LSV is a golf cart or a club cart.

Now in a reference to FIGS. 5-12, the LSV 200 comprises a deck 210 defining a deck surface 212, a first side edge 214 and a second side edge 216 that is spaced from the side edge 214 across a width of the deck 210. A portion of the deck surface 212 adjacent to and including the side edge 214 can be referred to as a threshold area. The LSV also comprises a suspension assembly 220 coupled to the deck 210. The suspension assembly 220 also comprises wheels 224 mounted on an axle 222. An electric motor or internal combustion engine 230 is coupled to the deck 210 and is being configured to move the deck 210. A steering assembly 236 is provided for steering the vehicle 200. At least one rear seat 240 is mounted on the deck 210 for carrying one or more users. A front seat 250 is mounted on the deck 210 for carrying one or more users, the front seat defines a void or a cavity 258 with the at least one rear seat 240.

Figure 5:
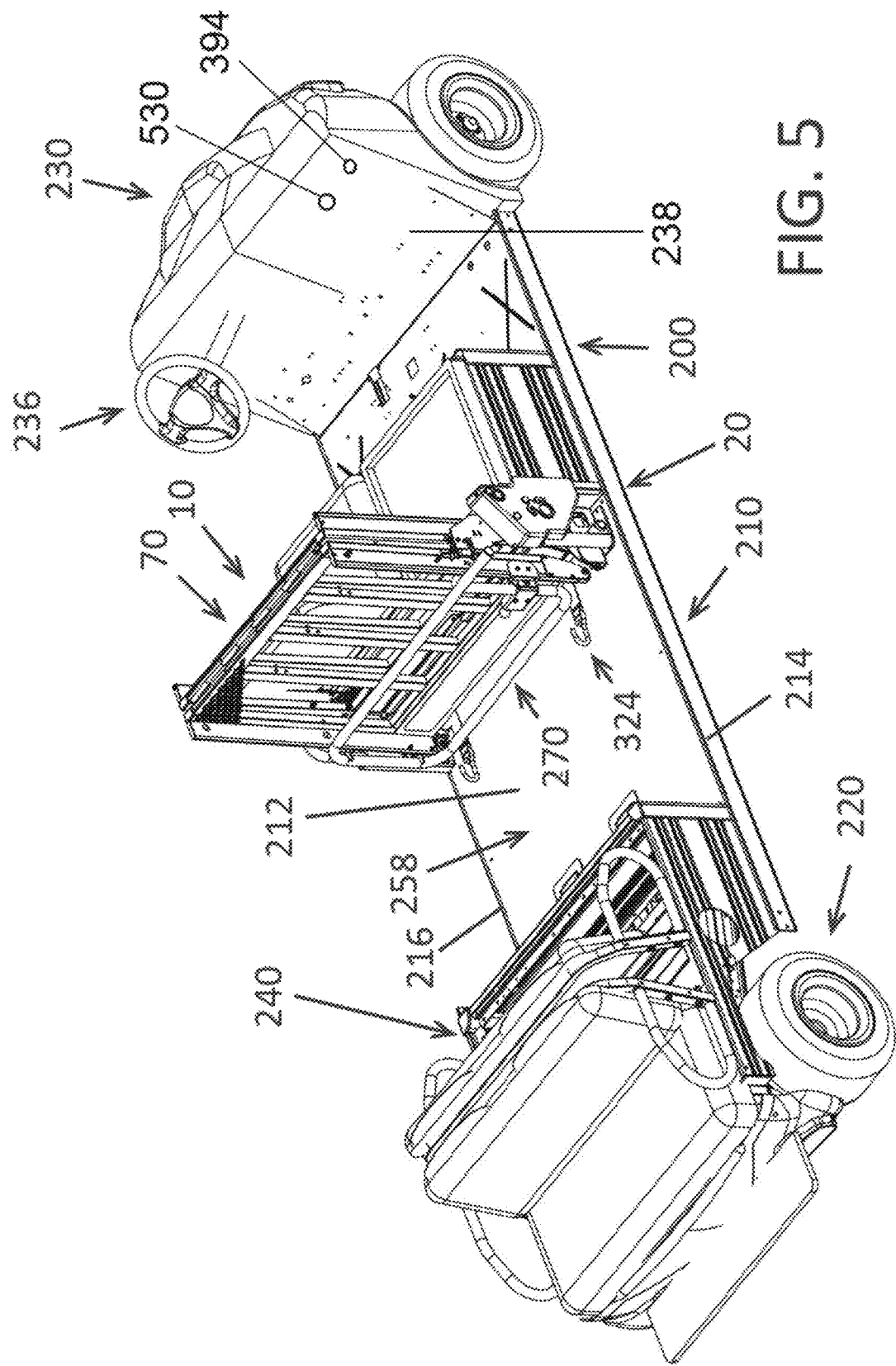
FIG. 5 illustrates a perspective view of the ramp assembly of FIGS. 1-4J installed on a vehicle in a stowed position in a combination with an off-side barrier shown in a stowed position.

FIG. 5 further illustrates the ramp assembly 10 of FIGS. 1-4J being in a generally folded stowed position within the void 258 and behind the front seat 250 adjacent the rear surface 252 thereof. In this position, the first and second ramp sections, 74 and 100 respectively, are in a surface-to-surface facing arrangement with each other and the surfaces of the ramp assembly 10 are disposed generally parallel to a rear surface of the front seat 250 and generally perpendicular to the side edges 214, 216.

The support 20 is illustrated as being rigidly secured to and upstanding on the deck surface 212. The flange 36 can be secured to a frame of the front seat 250. As it will be described further in this document, the ramp 70 can be latched in the stowed position so as to prevent unintended movement of the ramp 70 during a movement of the vehicle 200. As it can be further seen in FIG. 5, the remaining portion of the void or cavity 258 is free to allow unobstructed movement of the ambulatory users without any additional manipulation or intermediate movement of the ramp assembly 10.

The ramp assembly 10 of FIGS. 5-12 can be adapted with an optional barrier 270. The exemplary barrier 270, when provided, can be sized and configured to be manually positioned on the deck 210 in a first position of FIGS. 6 and 9-12 where the barrier 270 is disposed along the side edge 216 of the deck 210 between the front seat 250 and the at least one rear seat 240. The side edge 216 can be considered as an off-side edge, since the ingress into and egress from the vehicle 200 is from the side edge 214. Thus, the barrier 270 in this position provides a safety means for preventing the non-ambulatory individual from unintentionally falling off from the void or cavity 258. The barrier 270 is also configured to be manually positioned in a second position of FIG. 5, where the barrier 270 is disposed coplanar to the ramp assembly 70 being in the generally vertical folded stowed position. The barrier 270 is being illustrated in FIGS. 5-12 as comprising a frame-shaped member with a hollow interior. It is also contemplated that the barrier 270 can be provided as a solid frame or member or as a partially solid frame or member.

Figure 6:
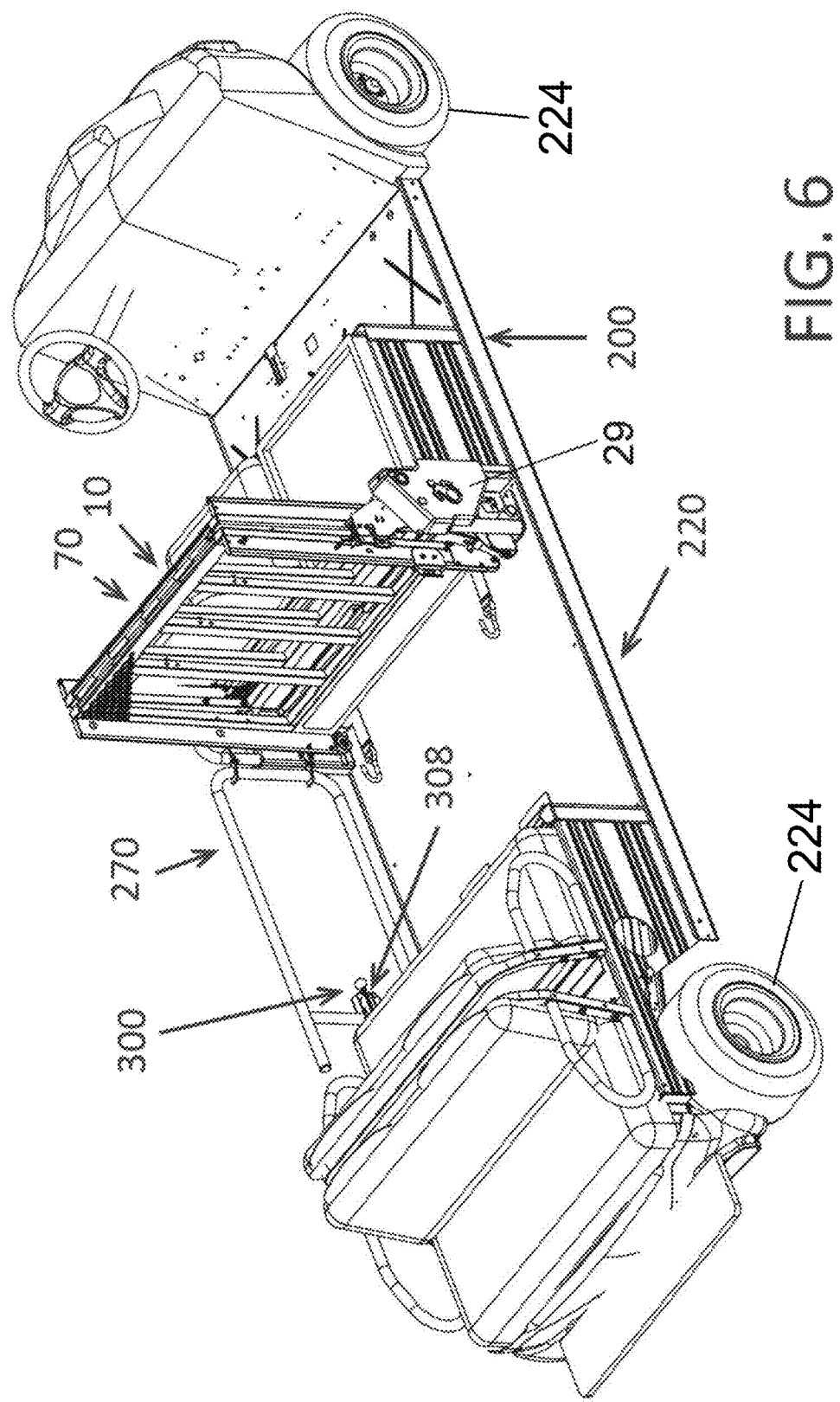
FIG. 6 illustrates another perspective view of the ramp assembly of FIGS. 1-4J installed on a vehicle in a stowed position an off-side barrier shown in a deployed position.
Figure 7:
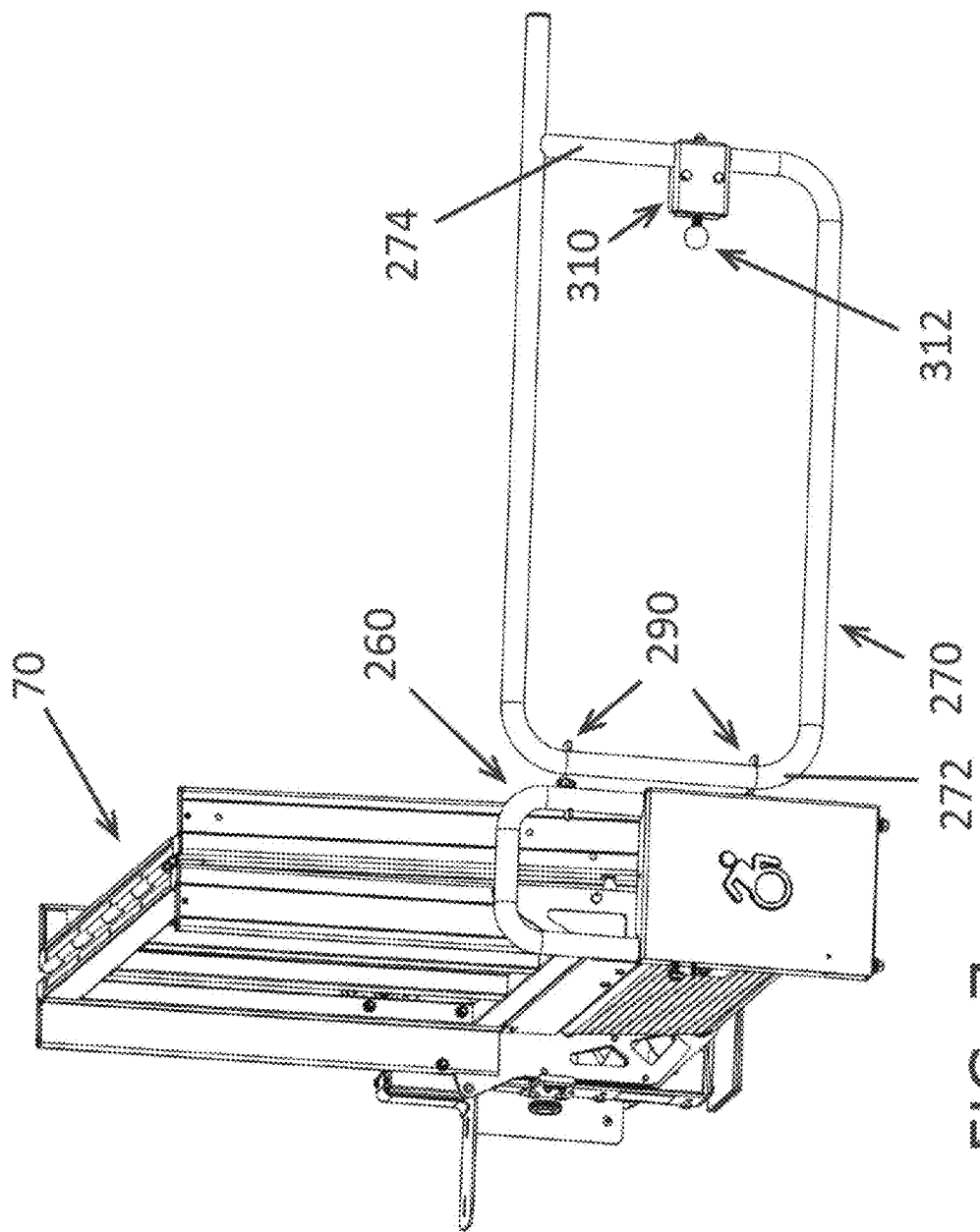
FIG. 7 illustrates a partial perspective view of an exemplary barrier that can be employed with the ramp assembly of FIGS. 1-4J.

As is best illustrated in FIGS. 6-7, the barrier 270 is being pivotally connected at one end 272 thereof to a barrier support 260 by way of hinge(s) 290. The barrier support 260 can be a portion of the vehicle 200 or can be provided as an addition to the vehicle 200 for field retrofit on the deck 210. The hinge(s) 290 can be any hinge arrangement suitable to essentially provide about 90 degree pivot or swing of the barrier 270. Advantageously, the barrier support 260 can be optionally configured with the above latch assembly 143 at a bottom edge thereof at so that the ramp 70 can be selectively latched in the stowed position and unlatched thereof. In this configuration, a latch pin 176 will engage the edge opening 144 or similar in the barrier support 260. The unlatching of the ramp 70 in this position can be provided by the pushbutton 524 connected via a cable (not shown) to the rotary latch 143.

Additionally or alternatively, another latch 143 can be provided in the member 264 mounted so as to receive the latch pin 176 when the ramp 70 is in the intermediate position and in the fully deployed position. In these positions, another pushbutton (not shown), similar or identical to the pushbutton 528 can be attached to a stationary structure of the vehicle and connected to this rotary latch 143 with another cable (not shown). This rotary latch 143 secures the distal end 71 of the ramp 70 being in the fully deployed or intermediate position. In other words, the distal end 71 of the ramp 70 is prevented from unintentional movement when the ramp 70 being in the fully deployed or intermediate position. Thus, particularly, in the intermediate position, the ramp 70 can remain stationary during vehicle movement.

Figure 8:
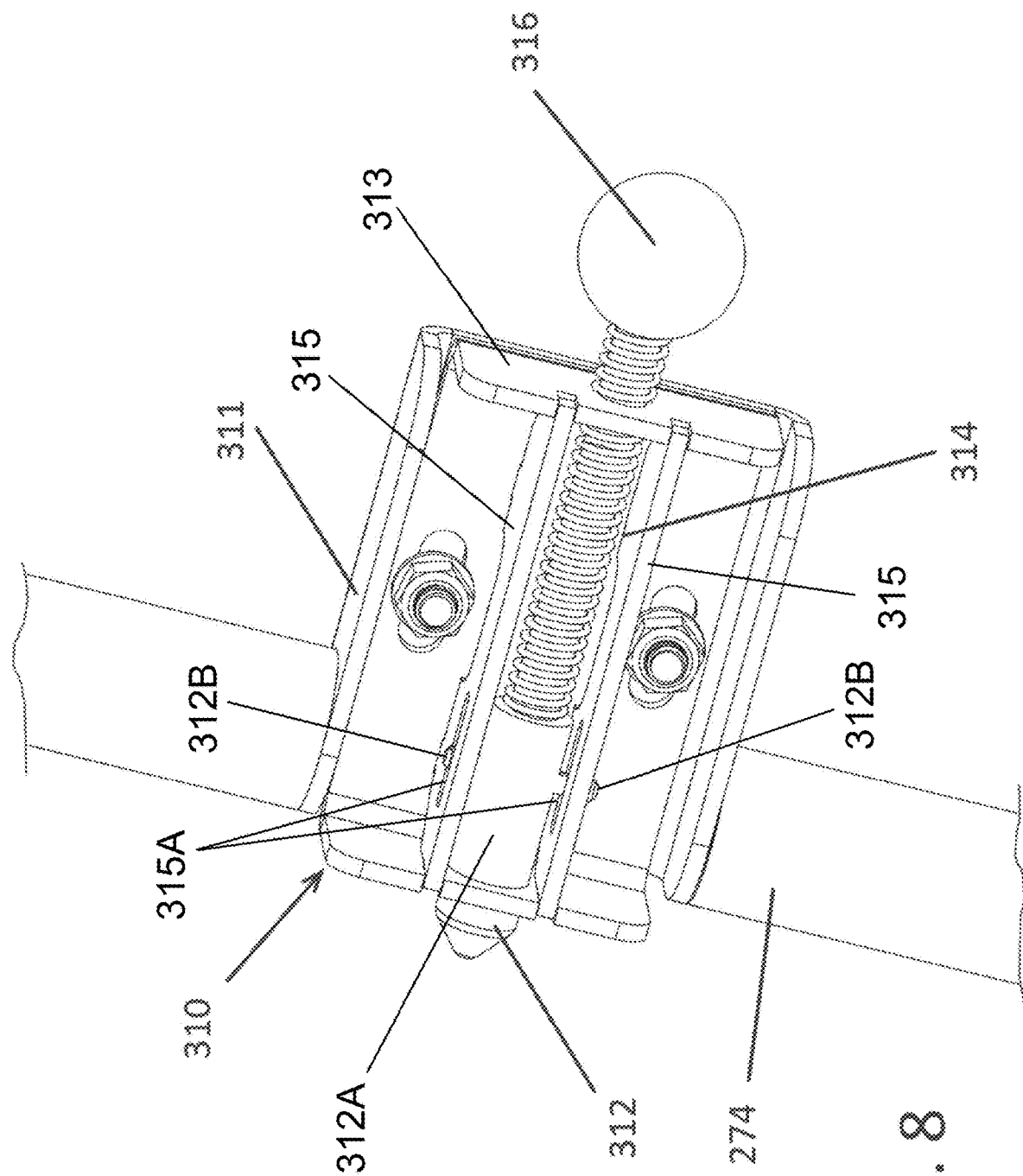
FIG. 8 illustrates a partial perspective view of an optional latch assembly that can be employed within the barrier of FIG. 7.
Figure 9:
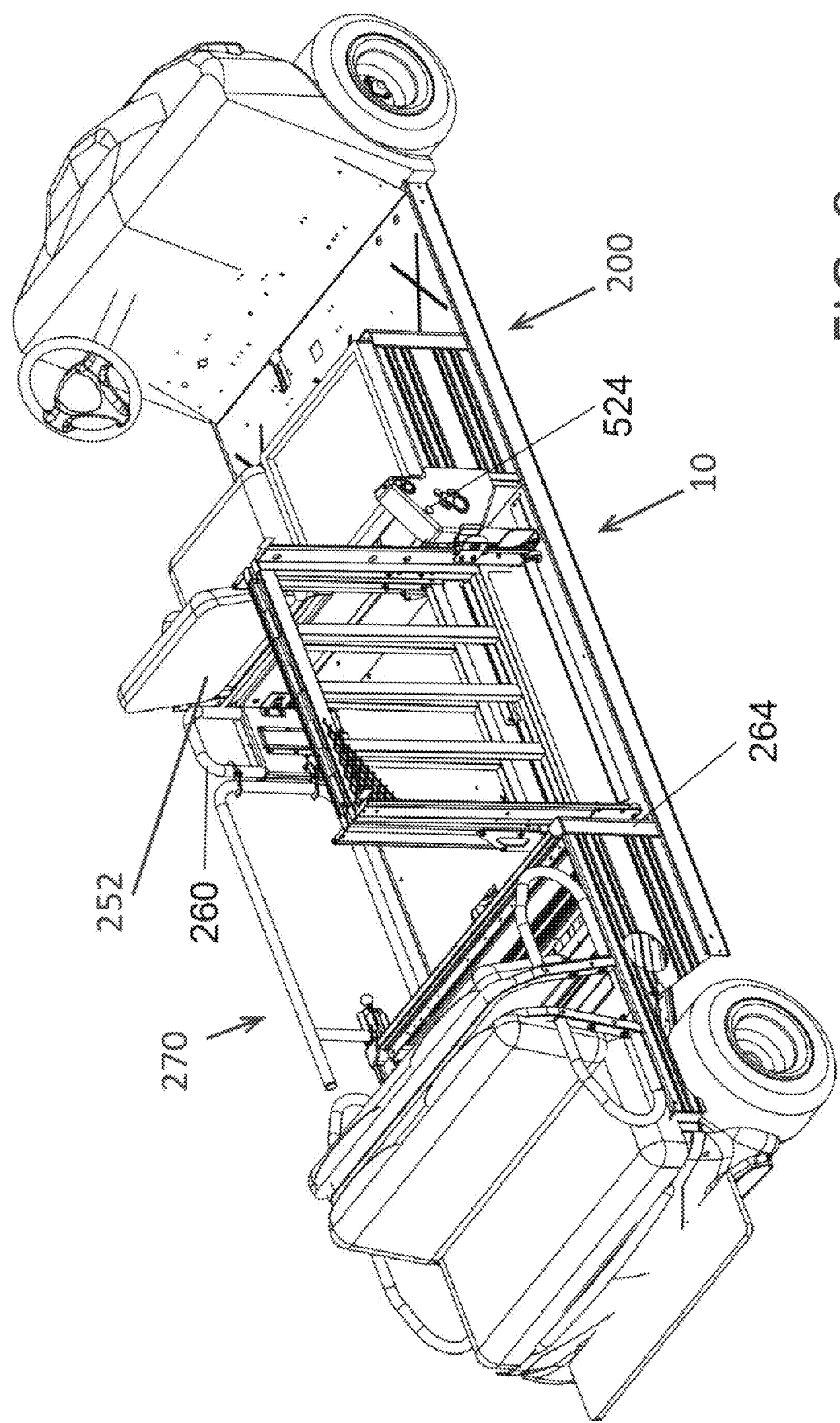
FIG. 9 illustrates a perspective view of the ramp assembly of FIGS. 1-4J installed on a vehicle in an intermediate folded (partially deployed) position along an edge of the vehicle structure.

The barrier 270 can be adapted with an optional barrier latch assembly 310, best illustrated in FIGS. 7-8. The barrier latch assembly 310 is mounted on an opposite end 274 of the barrier 270. The exemplary barrier latch assembly 310 comprises a latch pin 312 mounted for a linear movement within the latch housing 311. The latch pin 312 is spring loaded with a spring 314 against a rear flange 313 to be biased in a latched position. A pair of flanges 315 can be provided to guide a reciprocal linear movement of the latch pin 312. Additionally, the latch engaging portion 312A of the latch pin 312 can be adapted with protrusions 312B inserted into elongated slots 315B within the flanges 315. A longitudinally opposite end of the latch pin 312 can be adapted with a handle or a knob 316 for ease of grasp during use.

When the barrier 270 is adapted with the barrier latch assembly 310, it is contemplated to latch the barrier 270 in one or both of the first and second positions. Accordingly, a barrier retaining member 150 can be mounted on one side of the second ramp section 100, as best illustrated in FIGS. 1 and 3A to latch the barrier 270 in the second position where the latch pin 312 engages an aperture 152 within the barrier retaining member 150. Another barrier retaining member 300 can be mounted to another portion of the vehicle 200, for example on or next to the rear seat 240 or over the top of the rear seat 240 and adjacent the left rear arm rest. The purpose of this barrier retaining member 300 is to prevent the possibility of the ramp 70 and the offside barrier 270 from getting out of sequence.

The latch pin 312 is configured to selectively engage and disengage the aperture 152 in the first barrier retaining member 150 or the second barrier retaining member 300 when manually operated. Thus, the barrier 270 can be generally latched in one or both of the first or second positions. In other words, it will be understood that the ramp 70 and barrier 270 are mechanically interlocked therebetween when the ramp 70 is in the stowed position.

Figure 19:
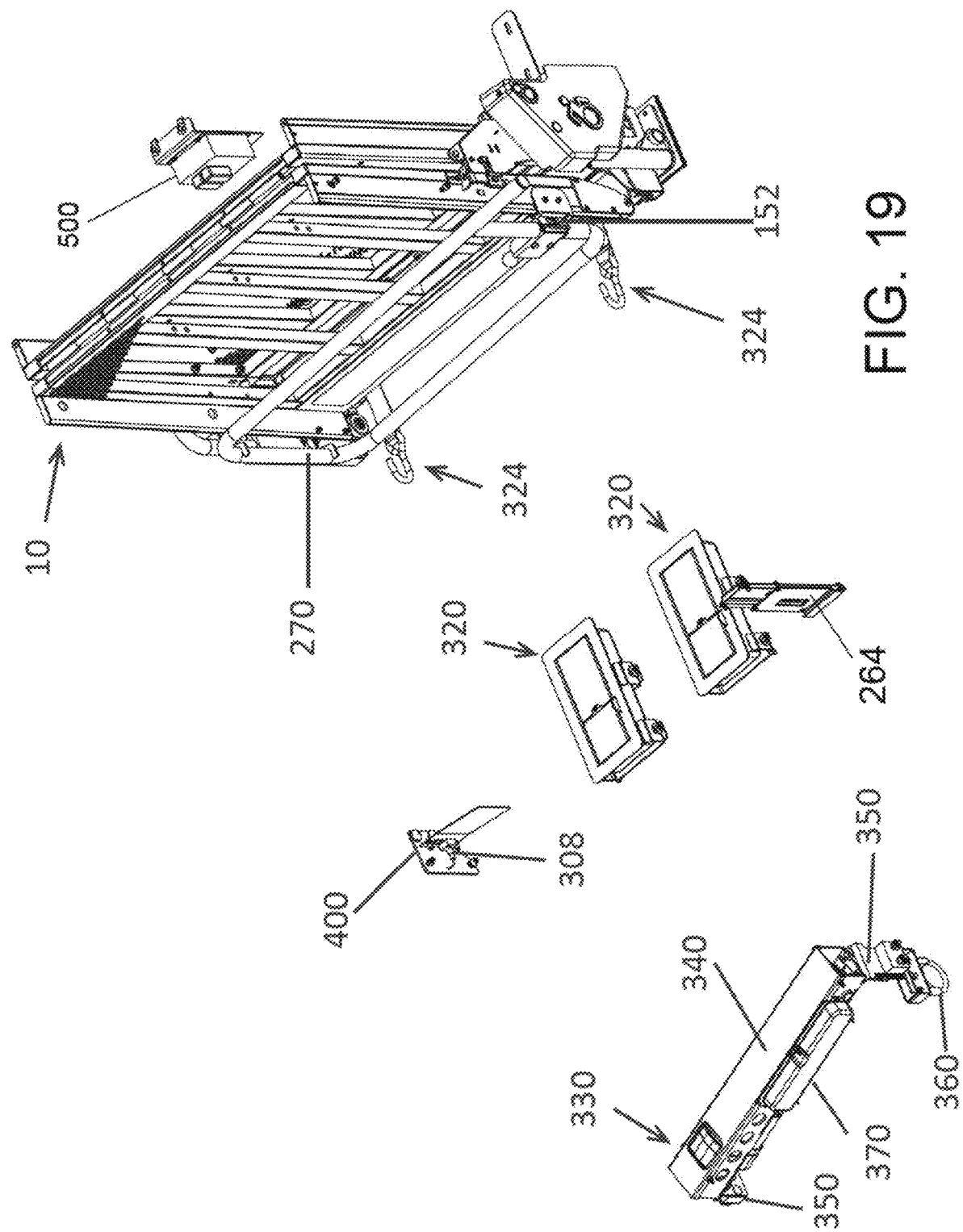
FIG. 19 illustrates a perspective view of an exemplary accessibility kit.
Figure 20:
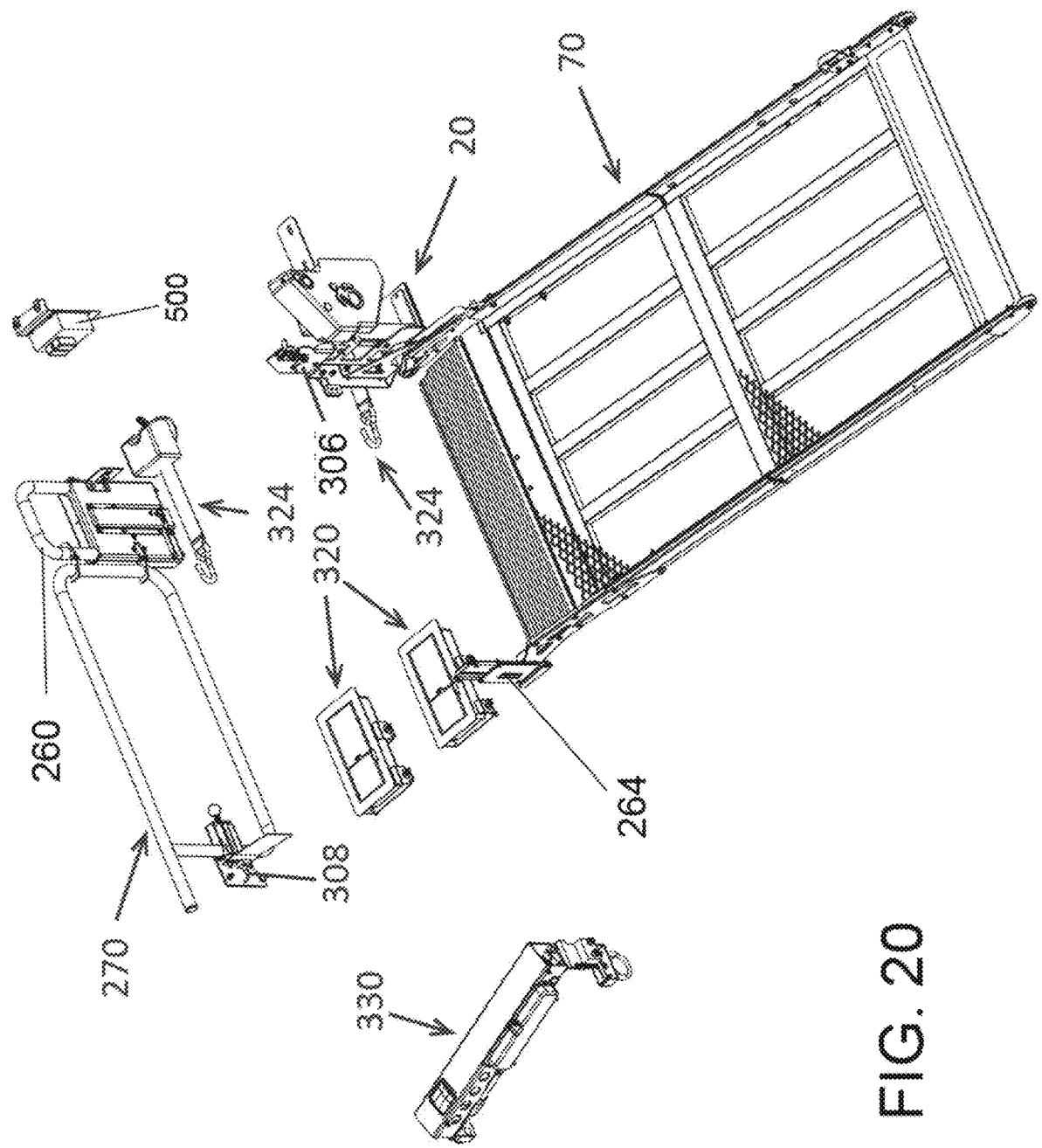
FIG. 20 illustrates another perspective view of the accessibility kit of FIG. 19.

It is also contemplated to electrically sense the barrier 270 being latched or unlatched. In an example, as is best shown in FIGS. 6 and 19, a barrier sensor 308 can be mounted to sense a presence or an absence of the barrier 270, and more particularly, the portion of the barrier latch 310 in the first position. The electrical output signal from the barrier switch or sensor 308 can be used to declare either latched or unlatched condition of the barrier 270 in one or both positions of the barrier 270.

The barrier switch 308 can be configured so its contacts are closed when the off-side barrier 270 is deployed across the side edge 316 and latched. Closed contacts of the barrier switch 308 pass current therethrough, thus switching the barrier switch input of a controller 500 to HIGH. In the event the contacts of the barrier switch 308 are NOT closed while the ramp fold switch 306 is open and the barrier switch input is LOW, the controller 500 can be configured to issue an audible and/or visual warning.

It also contemplated that the barrier 270 does not have to pivot and can be manually moved between the first and second positions. For example, bores or cavities (not shown) can be provided within the deck 210 along the edge 216 of the deck 210 and along the front seat 250 to receive abutments (not shown) on the lower edge of the barrier 270. Or, the barrier 270 can be manually positioned remotely from the ramp assembly 10, for example at a rear of the vehicle 200. Thus, in an embodiment, the barrier 270 is configured to be manually positioned on the deck 210 in a first position where the barrier 270 is disposed along the side edge 216 between the front seat 250 and the at least one rear seat 240, when the ramp 70 is being in the deployed unfolded position or being in the generally vertical folded intermediate position. The barrier 270 being also configured to be manually positioned in a second position remotely from the ramp 70 being in the generally vertical folded stowed position.

In any configuration, the barrier 270, when deployed along the side edge 216 of the vehicle 200, prevents the wheelchair bound individual to accidently roll-off of the side edge of the vehicle 200 from the vehicle deck surface 212.

Thus, the combination of the above described ramp assembly 10 and barrier 270 solves the problem of quickly and economically configuring the vehicle 200 for use by ambulatory or non-ambulator individuals by providing a folding ramp 70 and an offside barrier 270 that can be stowed when not in use by pivoting out of the normal entry ways so that vehicle access by ambulatory passengers is uninhibited. Further, the offside barrier 270 can be mechanically interlocked with the ramp 70 such that said offside barrier 270 must be at least partially deployed before the ramp 70 can be pivoted into the vehicle threshold area along the side edge 214. Finally, the offside barrier 270 can be further interlocked with the vehicle 200 such that both an audible and visual indicator are provided to the operator in the event the offside barrier 270 is not completely deployed when the ramp 70 is deployed.

The above described ramp assembly 10 can be also adapted with an optional transfer plate 170 being hingeably or stationary coupled to the end 76 of the first ramp section 74 in order to cover the side edge 214 of the deck 210 when the ramp 70 is in the fully deployed position. In other words, the transfer plate 170 can be referred to as a threshold.

The above described ramp assembly 10 can be also adapted with an optional wheel 174 being mounted at the distal bottom end of the ramp 70 to contact a deck portion of the vehicle during operation of the ramp 70. More specifically, the option wheel 174 is pivotally attached to the first ramp section 74 adjacent the first end 76 thereof. The wheel 174, when provided, functions or configured to support weight of the ramp 70 at the distal end 71 and therefore reduce bending moment onto the pivot member 24 during operation of the ramp 70. The wheel 174, when provided, can also reduce force required to manually pivot the ramp 70 about the vertical axis 32. A peripheral surface of the wheel 174, when provided, abuts the deck surface 212 during pivoting movement of the ramp 70 and functions or configured to support the weight of the ramp 70 on the deck surface 212, thus reducing the forces and/or moments onto the support 20. Another arm 58A can be attached to an opposite side of the first ramp portion 74 to mount the wheel 174 for a rotation thereon. The axle of the wheel 174 can extend outwardly from the exterior surface of the arm 58, as is best illustrated by the latch pin 176 in FIG. 3B, although the latch pin 176 can be offset from the rotational axis of the wheel 174.

It is also contemplated herewithin that to prevent sagging of the ramp 70 at the distal bottom end 71 thereof, being furthest from the support 20, the pivot member 24 can be preloaded with the optional mount 38 of FIGS. 4C-4D. In order to achieve such pre-loading, the first member 38A is secured to the top end of the pivot member 24 so that the elongated slots are oriented generally parallel to the side edge 214. The second member 38C is than affixed to the vehicle that the elongated slots 38D are oriented in a direction generally normal to the side edge 214. It must be noted, that such orientation of the elongated slots 38B and 38D allows adjustment of the optional mount 38 in two different directions, along the length and the width of the vehicle 200.

After the ramp 70 is securely fastened to the support 20 and when the fasteners 38G securing the first member 28A to the second member 38C are loose or loosened, the distal bottom end 71 is lifted to a desired height so as to account for the deflection due to the weight of the ramp 70. In a non-limiting example, a gage block (not shown) can be placed under the ends 74, 106 adjacent the distal bottom end 71. In this position the distal bottom end 71 will be at a higher vertical elevation than the proximal bottom end 73 of the ramp 70. Then, the bottom fasteners 38G adjacent the second member 38B are tightened. Next, the ramp 70 is pivoted into the intermediate position being generally parallel to the side edge 214 and the gage block (not shown) is again placed under the ends 74, 106 adjacent the distal bottom end 11. Then, the top fasteners 38B adjacent the first member 38A are tightened. In order to compensate for any potential loosening of the fasteners 38G from the threaded studs 38F, a hole 38H can be drilled through at least the first member 38A and the second member 38C and so that a pin (not shown) can be inserted under friction (i.e. tight or interference fit) or threaded fasteners 38F and 38G can be used. Finally, the gage block (not shown) is removed to allow movement of the ramp 70.

It must be noted that preloading of the ramp 70 can essentially comprise a small offset, due to the gage block (not shown), of the top end of the pivot member 24 in a horizontal direction relative to a bottom end of the pivot member 24.

Pre-loading of the ramp 70 compensates for a condition when the deck surface 212 in the vehicle 200 is sloped toward the side edge 214. In other words, the deck surface 212 is uprising into the void 258. The sloped deck surface 212 changes a vertical distance between the deck surface and the ends 74, 106 of the ramp 70 and, more particularly making use of the wheel 174 impractical or undesirable. Furthermore, operating the ramp 70 without the wheel 174 may be beneficial in winter climates, despite snow, ice and sand that will certainly accumulate on the deck surface adjacent the side edge 214. Finally, on some deck surfaces 212, the peripheral surface of the wheel 174 may leave marks due to debris adhered to the wheel surface, particularly when the vehicle 200 is operated in winter climates.

In an example, the mount 38 and the wheel 174, when provided, provide a means for preventing sagging of the ramp 70 during pivoting movement. In an example, the mount 38 and the wheel 174, when provided, provide a means for supporting weight of the ramp 70 during pivoting movement.

The mount 38 can be used to improve operation of ramps other than the above described ramp 70 as a field retrofit. It would be understood that the shape of the first member 38A and the second member 38C will depend on a particular configuration of the vehicle.

The above described optional ramp lifting assembly 40, when provided allows the ramp 70 to compensate for deck surface 212 being sloped downwardly toward the side edge 214. With the inclined curved surface 42 provided such that the roller 46 travels downwardly when the ramp 70 is moved from its generally stowed position, the ramp 70 lowers as it moves toward the side edge 214 and is disposed at its lowest elevation when in the intermediate position. When the ramp 70 is manually pivoted into the stowed position, the roller 46 travels upwardly on the inclined curved surface 42 and rests on the generally planar and horizontal surface 44. Thus, the ramp assemblies 10 equipped with the ramp lifting assembly 40 overcomes presence of sloped deck surfaces in the vehicle.

In an example, it is also contemplated herewithin that the planar surface 44 can be provided as concave surface. Then, the roller 46 seated in such concave surface will restrict pivoting movement of the ramp 70 from the folded position, even when such ramp 70 may not be mechanically latched. In other words, the concave surface defines a detent for the roller 46.

In an example, it is also contemplated herewithin that the roller 46 can be latched when the ramp 70 is in the stowed position.

The ramp lifting assembly 40 can also improve operation of ramps other than the above described ramp 70 as a field retrofit.

Figure 13:
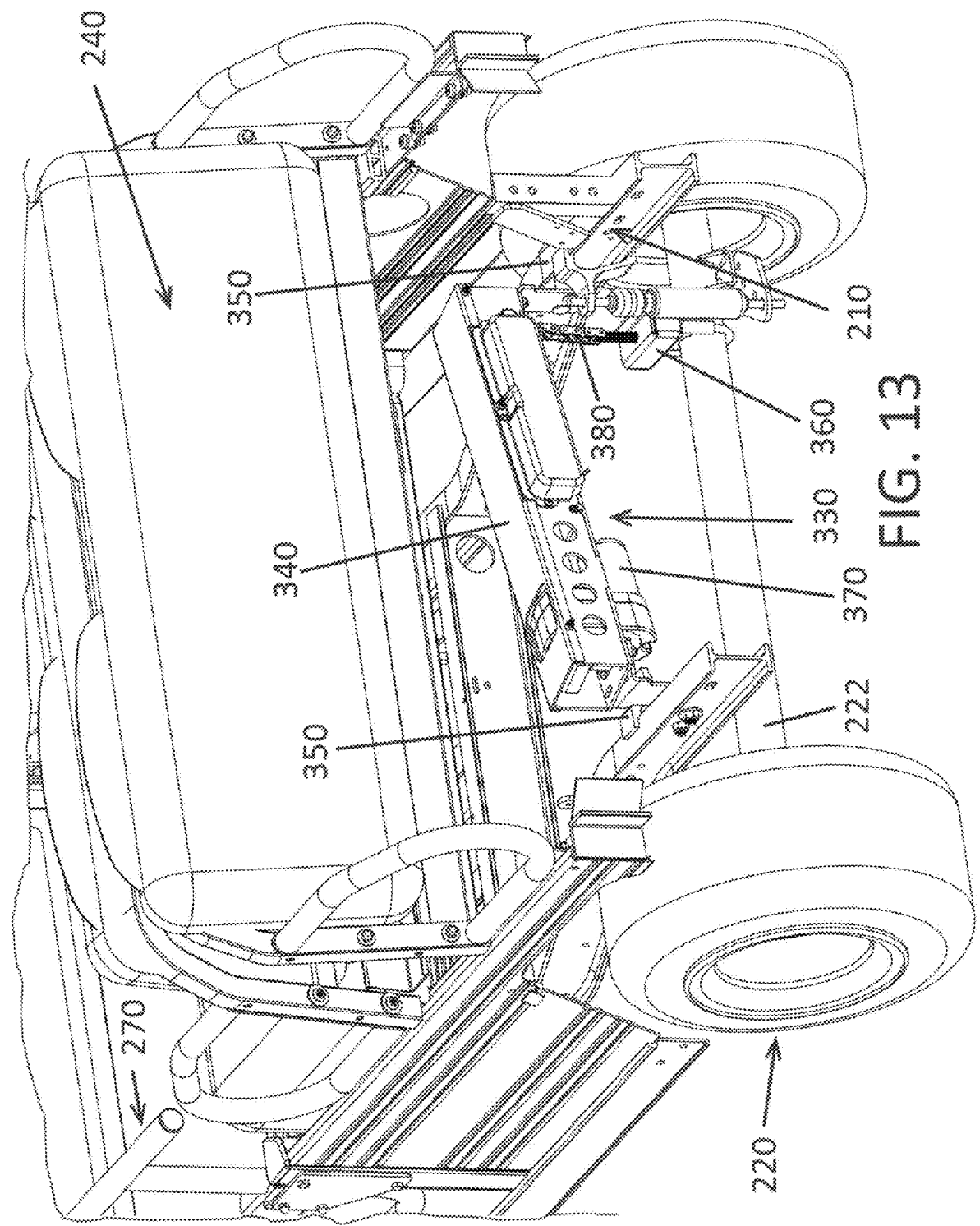
FIG. 13 illustrates a perspective view of an exemplary kneeling mechanism.
Figure 14:
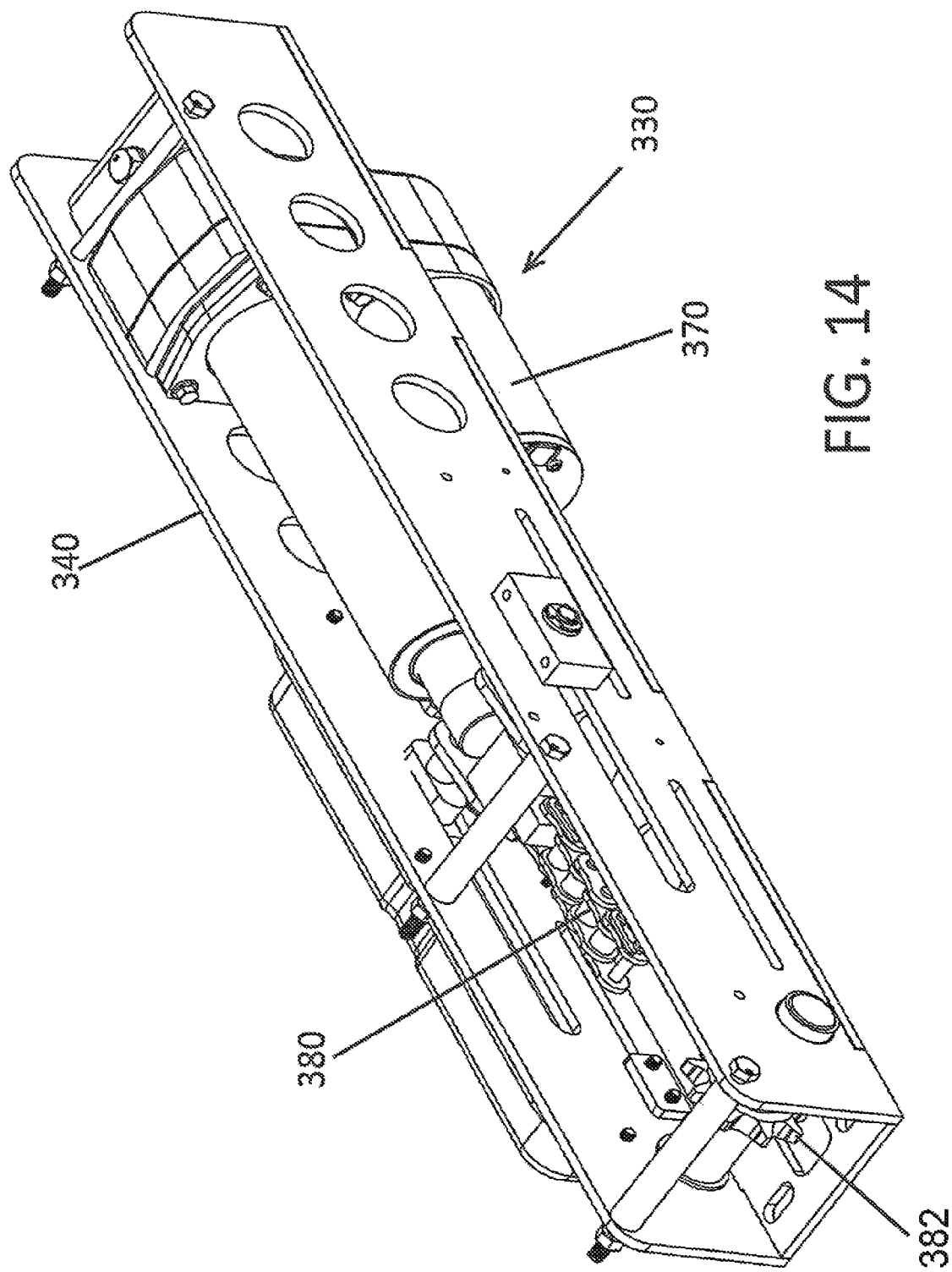
FIG. 14 illustrates an actuator employed within the exemplary kneeling mechanism of FIG. 13.

In an embodiment, the vehicle 200 can be adapted with an optional kneeling mechanism 330, best shown in FIGS. 13-14. The kneeling mechanism 330 is mounted adjacent the rear axle 222. The exemplary kneeling mechanism 330 comprises a housing 340 that is rigidly mounted to the vehicle deck 210, for example by a pair of brackets 350. An axle clamp 360 is suspended from the housing 340 to cage a portion of an axle 222 of the suspension assembly 220. An actuator 370 is supported by the housing 340. The actuator 370 is connected to and suspends the clamp 360 with a chain 380. Since the actuator 370 is mounted horizontally during use and the force required to compress the suspension is vertical, the chain 380 engages a rotating sprocket 382 which affects the necessary direction change. In a non-limiting example, the chain can be of a Morse type chain. The actuator 270 can be also referred to as a linear actuator 370 or an electromechanical linear actuator 370.

During kneeling operation (non-ambulatory individual loading or off-loading), the actuator 370 is operable to pull the chain 380, thus reducing a distance between the clamp 360 and the housing 340 and, consequently pull the deck 210 toward the axle 222. To return deck surface 212 to the normal operating height, the actuator 370 is operable to release the chain 380, thus increasing the distance between the clamp 360 and the housing 340 and pushing the deck 210 away from the axle 222.

The kneeling suspension or mechanism 330 can be provided in a combination with the ramp assembly 10, that facilitates access to the vehicle loading deck surface 212, to ensure maximum maneuverability for the widest range of mobility aid types and passenger/operator skill levels, the lowest slope practicable is desirable as it enables the passenger/operator to use the upper surface area of the ramp assembly 10 as a maneuvering surface.

The kneeling suspension 330 significantly reduces the entry ramp slope.

The kneeling feature can be operator "selectable". In the event of the need to board or deboard a wheelchair adjacent a curb and sidewalk or other such change in elevation such that the knelt deck height may be lower than the ground to which the ramp is deployed, the operator can set the kneeling switch 394 to "off". In this way, the vehicle deck will not be pulled down when the ramp 70 is unfolded.

In the event the vehicle 200 is parked adjacent a curb such that the kneeling feature is not required to provide the lowest slope practicable, the kneeling feature can be disabled by the vehicle operator. Accordingly, with the kneeling switch 394 in the "off" position, when the ramp 70 is deployed, the vehicle suspension will not be pulled down.

Power for the actuator 370 is provided by the controller 500 but can be also provided from an electrical circuit of the vehicle 200 or from a remote source, for example such as a battery (not shown). When kneeling is enabled (i.e. the kneeling feature is turned "on" by the switch 394) and the ramp 70 is unfolded, the actuator 370 will retract, deflecting the vehicle suspension 220 as has been described above.

Figure 10:
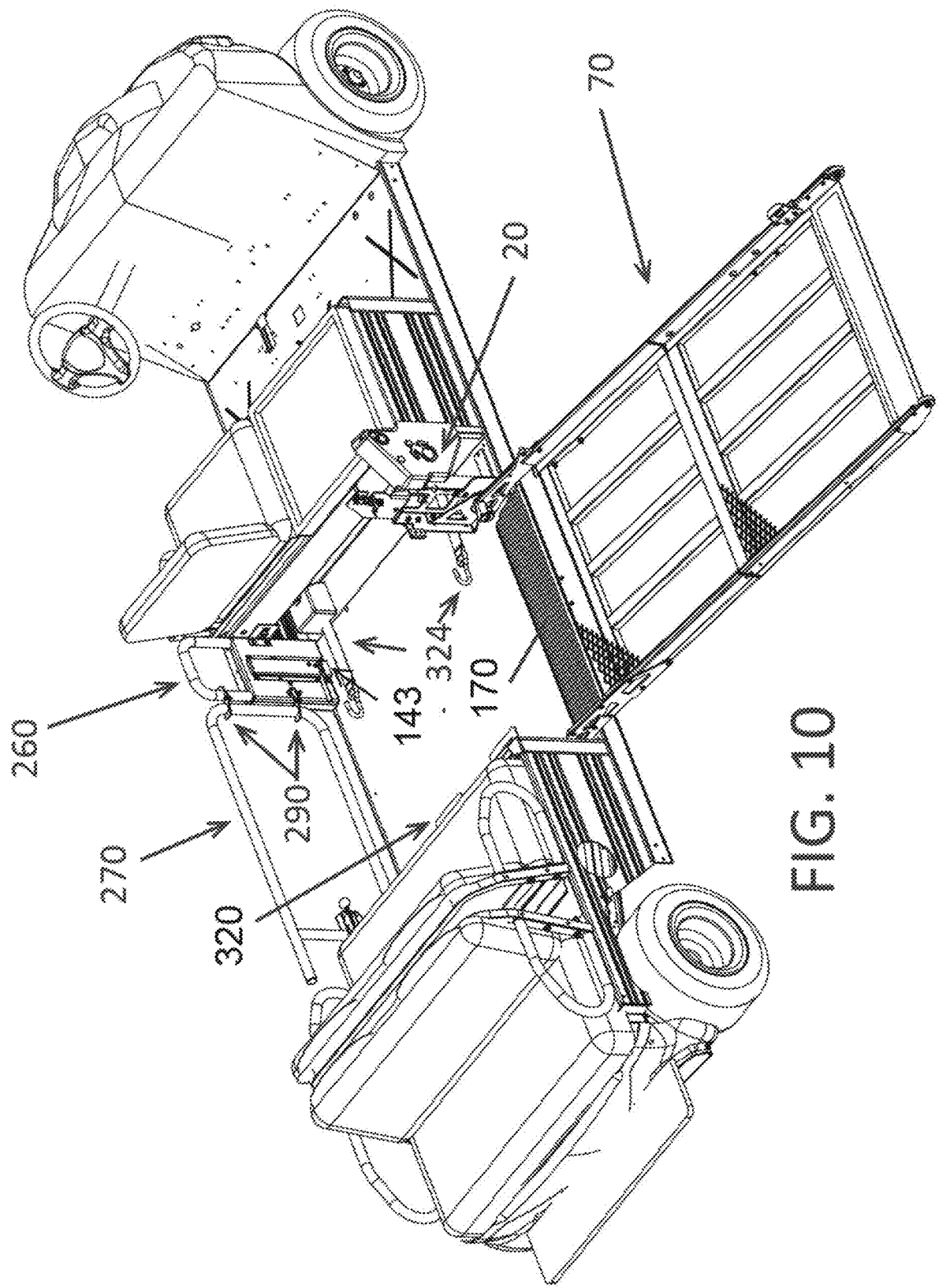
FIG. 10 illustrates a perspective view of the ramp assembly of FIGS. 1-4J installed on a vehicle in a deployed position.
Figure 11:
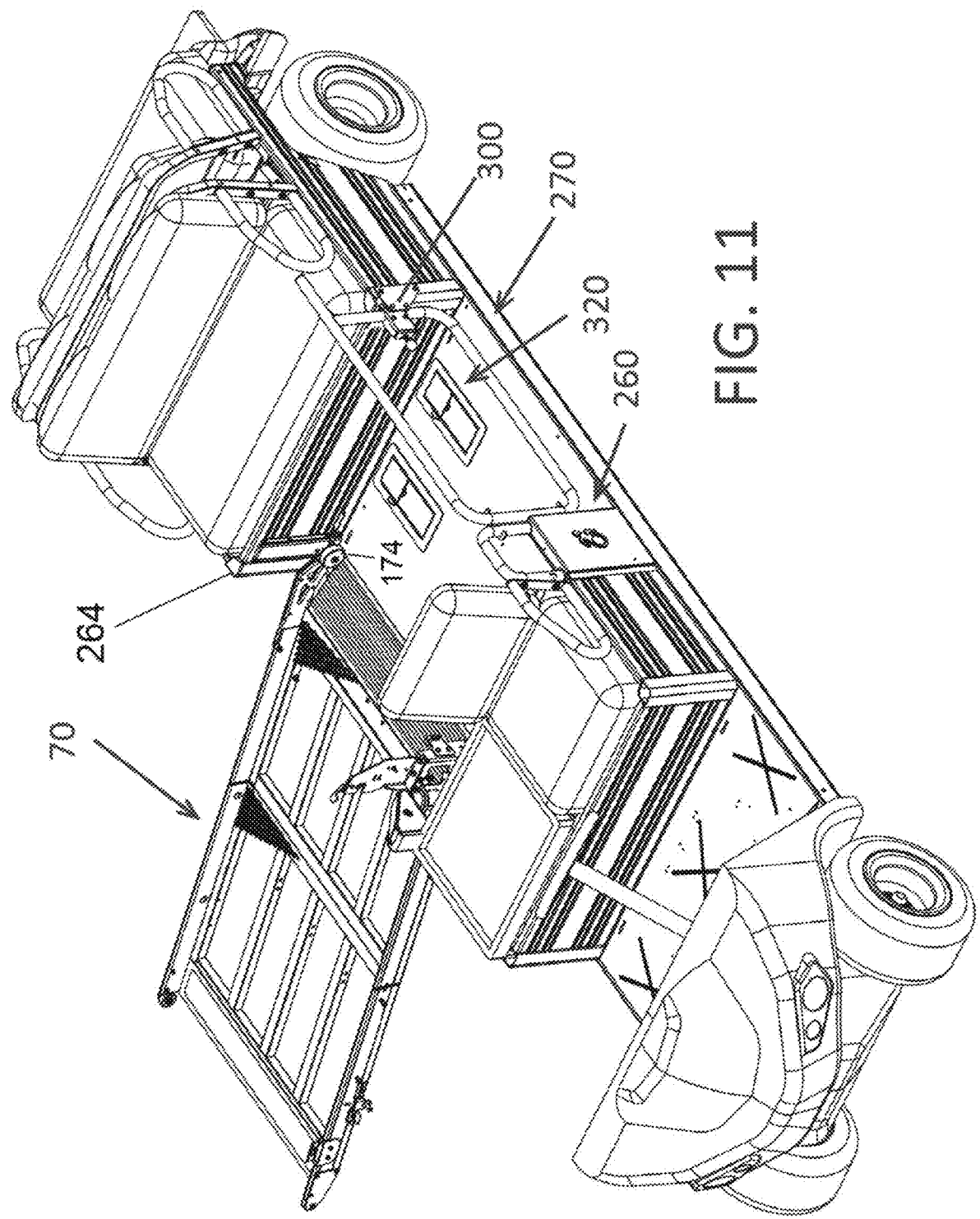
FIG. 11 illustrates another perspective view of the ramp assembly of FIGS. 1-4J installed on a vehicle in the deployed position.
Figure 12:
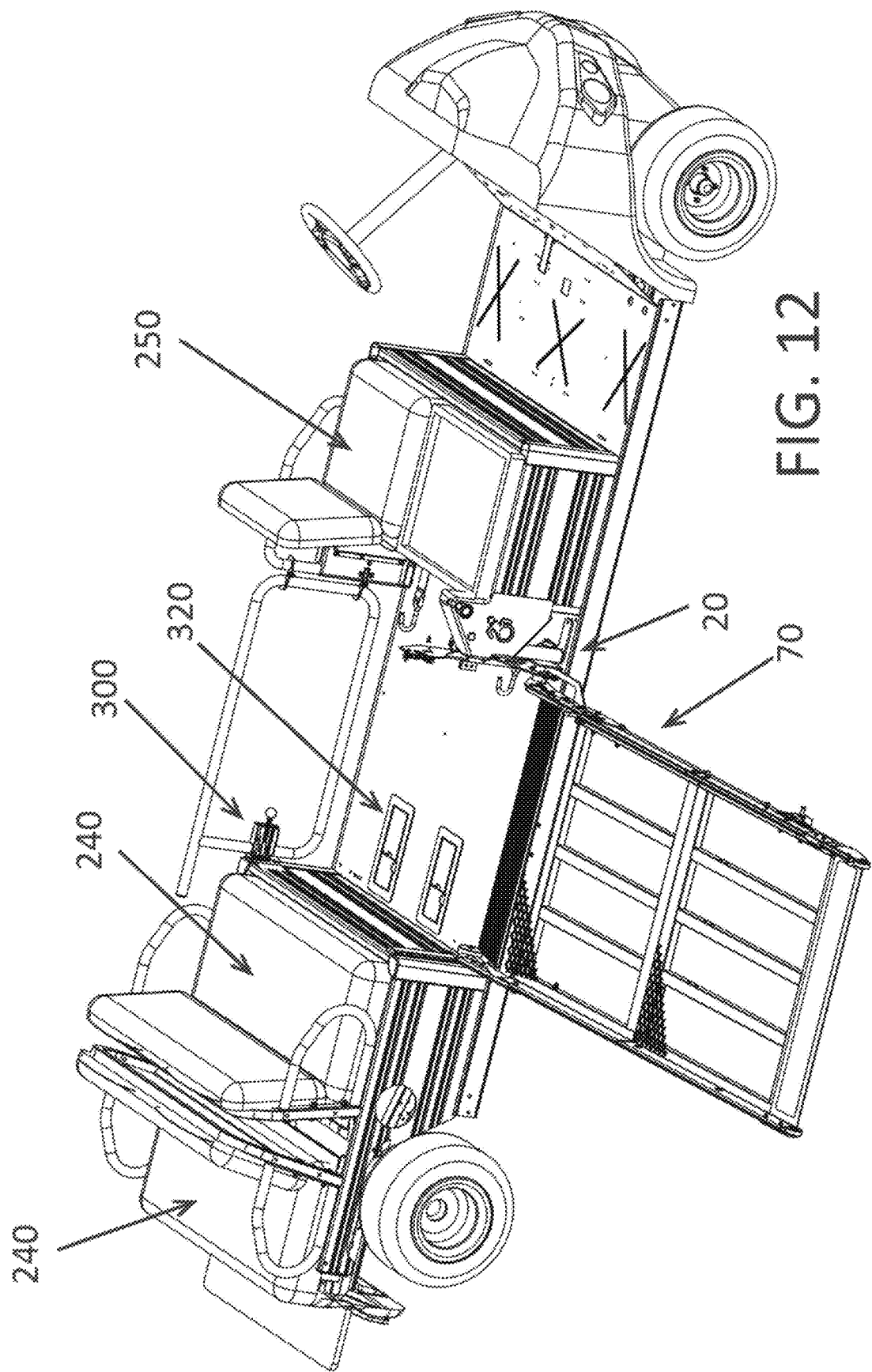
FIG. 12 illustrates another perspective view of the ramp assembly of FIGS. 1-4J installed on a vehicle in the deployed position.

In an embodiment, the above described ramp assembly 10 can be also provided with optional wheelchair restraining devices 320 and/or 324. The wheelchair restraining device 320 is best illustrated in FIGS. 11-12 as being mounted within a thickness of the deck 210 generally flush with the deck surface 212. Such in-deck retractors can be of the type as manufactured by API CZ s.r.o. in the Czech Republic. The manually or electrically operable wheelchair restraining device 324 is best illustrated in FIGS. 10 and 12 as being mounted on the deck surface 212. Such electrically operable wheelchair restraining device 324 can be of the type as manufactured by Q'Straint of Germantown, WI under QER-4000 model or by OrthoSafe of Trenton, NJ Two wheelchair restraining devices 320 and two wheelchair electrically operable restraining devices 324 can be provided in a combination with each other. Each of the wheelchair restraining device 320 or 324 comprises a housing and a retractable strap terminated by a hook-shaped member that can be attached onto the wheelchair.

In addition to controlling operation of the kneeling system, the controller 500 controls operation of the electrically operable wheelchair restraining device 324 and vehicle interlocks and hazard warnings. The controller 500 can be any one of a programmable logic controller (PLC), a relay logic controller, a microprocessor-based controller and any combinations thereof. For example, the PLC can receive inputs from one or more contacts on one or more replays or can output voltage to energize or deenergize relay coil. The controller 500 can be also referred to as a processing device and, in one example, is a programmable controller comprising one or more microprocessors and a non-transitory computer readable medium comprising executable instructions that, when executed by the one or more processors, cause the one or more processors to perform various method steps and control various electrical components. In any configuration, the controller 500 receives input signals from sensors, switches, and relay contacts and provides outputs for the wheelchair restraint(s) 324, kneeing actuator 370 and audible and visual indicator(s). In an example, the controller 500 can be mounted directly or indirectly on the support 20. In an example, the controller 500 can be mounted remotely from the ramp assembly 10, for example within a support structure of the front seat 250. In an example, the controller 500 can be even integrated into a control circuit of the vehicle 200.

The basic method of preparing the vehicle 200 for loading of non-ambulatory and/or limited mobility individuals comprises the steps of manually pivoting the ramp 70 about the vertical axis 32 from its stowed position within the cavity 258 of the vehicle 200 into an intermediate position, then manually pivoting the ramp 70 about the horizontal axis 34, and manually pivoting the second ramp section 100 away from the first ramp section 74 into the fully deployed position. Pivoting of the second ramp section 100 away from the first ramp section 74 can be done during manually pivoting the ramp 70 about the horizontal axis 34. When the ramp 70 is in stowed and intermediate positions, the ends 76 and 104 are elevated above the deck surface 212 of the vehicle 200. In the fully deployed position, the end 76 is disposed outwardly from the side edge 214.

The basic method of loading non-ambulatory and/or limited mobility individual(s) into a cavity of a vehicle comprises the steps of manually pivoting the ramp 70 about the vertical axis 32 from its stowed position within the vehicle into an intermediate position, then manually pivoting the ramp 70 about the horizontal axis 34 outwardly from the vehicle, manually pivoting the second ramp section 100 away from the first ramp section 74 into the fully deployed position, manually pivoting the second ramp section 100 toward the first ramp section 74 after loading the non-ambulatory and/or limited mobility individual(s) into the cavity of the vehicle and manually pivoting the ramp 70 about the horizontal axis 34 back into the intermediate position. Pivoting of the second ramp section 100 toward the first ramp section 74 can be done during manually pivoting the ramp 70 about the horizontal axis 34.

The basic method of unloading non-ambulatory and/or limited mobility individual(s) from a cavity of a vehicle comprises the steps of manually pivoting the ramp 70 about the horizontal axis 34 from the intermediate position into a position outwardly from the vehicle, then manually pivoting the second ramp section 100 away from the first ramp section 74 into the fully deployed position, next manually pivoting the second ramp section 100 toward the first ramp section 74 after unloading the non-ambulatory and/or limited mobility individual(s) from the cavity of the vehicle, manually pivoting the ramp 70 about the horizontal axis 34 into the intermediate position and manually pivoting the ramp 70 about the vertical axis 32 into its stowed position within the cavity of the vehicle.

FIGS. 8-12 also illustrate an exemplary method for enabling transporting of ambulatory, semi-ambulatory and non-ambulatory users on an electric or a combustion-powered utility vehicle 200, the electric utility vehicle 200 comprising a deck 210, an electric motor or a combustion engine 230 coupled to the deck and configured to propel the deck 210, a steering assembly 236 for steering the electric or the combustion-powered utility vehicle, and at least one rear seat 240 mounted on the deck 210 for carrying one or more users and a front seat 250 mounted on the deck 210 for carrying one or more users and a defining a void with the at least one rear seat 240. The method comprises the steps of mounting a personal mobility vehicle access assembly 10 in the void 258, the personal mobility vehicle access module comprising a ramp 70, the ramp 70 movable between a generally vertical folded stowed position behind the front seat 250 in a direction generally normal to a length of the deck, a deployed unfolded position defining an inclined ramp 10 surface, and a generally vertical folded intermediate position along one side edge of the deck; positioning the ramp 10 in the generally vertical folded stowed position behind the front seat 250 for carrying only ambulatory users; positioning the ramp assembly 10 in the deployed unfolded position for enabling loading or unloading of non-ambulatory user(s); and positioning the ramp 10 in the intermediate stowed position of FIG. 9 for carrying the non-ambulatory user(s) being present on the deck 210 during movement of the electric or the combustion-powered utility vehicle 200.

The method can further comprise an optional step of securing, with retractable straps, the non-ambulatory user(s) being seated in personal mobility vehicle and being loaded onto the electric or the combustion-powered utility vehicle.

The method can further comprise an optional step of mounting wheelchair restraining device 320 with the retractable straps within a thickness of the deck 210 so that a top surface of each restraining device 320 is being generally flush with a top surface 212 of the deck 210.

The method can further comprise a step of mounting the barrier 270 on the deck 210 for a movement between a first position where the barrier 270 is disposed along an opposite side edge 216 of the deck 210 and a second position where the barrier 270 is disposed coplanar to the ramp 70 being in the generally vertical folded stowed position, a step of moving the barrier 270 into the first position before pivoting and moving the ramp 70 into the deployed unfolded position for enabling egress or ingress of non-ambulatory user(s) or positioning the ramp 70 in the intermediate stowed position for carrying the non-ambulatory user(s) being present on the deck during movement of the electric utility vehicle and a step of moving the barrier 270 into the second position when positioning the ramp 70 is in the generally vertical folded stowed position behind the front seat 250.

Additional detail steps of the method of converting the vehicle between carrying ambulatory and non-ambulatory passengers can be also described as follows. The method steps described below are related to the ramp assembly 10 equipped with optional barrier 270, kneeling suspension mechanism 330, wheelchair restraining devices 320 and/or 324, and various sensors, safety interlocks and annunciators. The additional detail steps are also related to an exemplary control block diagram of FIG. 18.

Any of the above methods may comprise a step of supporting a weight of the ramp 70 during use by providing an optional wheel 174 mounted for a rotation adjacent a bottom end 71 which is furthest from the ramp support 20.

Any of the above methods may comprise a step of at least reducing if not completely eliminating sagging of the ramp 70, due to a weight thereof, at a distal end 71 during use by preloading a pivot member 24 with the mount 38.

Any of the above methods may comprise a step of at least reducing if not completely eliminating bending moments onto the support 20 due to the weight of the ramp 70 by providing an optional wheel 174 mounted for a rotation adjacent a bottom end 71 which is furthest from the ramp support 20.

Any of the above methods may comprise a step of lifting a distal end 71 of the ramp 70 during use thereof by preloading a pivot member 24 with the mount 38.

Any of the above methods may comprise a step of lifting or lowering the ramp 70 in the vertical direction during the pivoting movement of the ramp 70 between folded and intermediate positions.

Starting with the wheelchair accessibility system, such as the ramp assembly 10 equipped with the barrier 270, wheelchair restraints 320 and 324 and the kneeling mechanism 330, with the ramp 70 stowed for unhindered access by ambulatory passengers, additional operation steps, including the sequence of operation can be as follows. All time durations described below are not to be construed as limiting. In other words, more or less time may be needed depending on the operator of the vehicle, design of the kneeling suspension, use of optional interlocks, etc.

Deploy the Barrier 270

First, release the barrier 270 by pulling on the latch pin 312 and moving it in a direction to disengage the aperture 152 in the first barrier retaining member 150. Then, pivot the barrier 270 away from the ramp 70 and into the first position along the side edge (or offside threshold area) 216 (see FIG. 6) before the ramp 70 can be pivoted into the threshold area adjacent the side edge 214. Swinging or pivoting the barrier 270 across the offside threshold area 216 into the first position along the side edge 216 prevents wheelchairs from inadvertently rolling off of the opposite side defined by the side edge 216. It must be noted that the barrier 270 only opens inward, toward the ramp 70 being in a stowed position. The above described barrier 270 can be deployed in about 15 seconds.

Swing the Ramp 270 into the Threshold Area

Unlatch the ramp 70 from the barrier support 260 with the pushbutton 258 and enable the swinging or pivoting of the ramp 70 into the threshold loading area and into the intermediate position along the side edge 214. Pivot the ramp 70 with the flange 28 to the point where the latch pin 176 is received within an opening of the rotary latch 143 in the member 264. The above described ramp 70 can be pivoted in about 20 seconds.

Deploy the Ramp 70

Release the ramp fold latch 146 on the latch bracket 141 to separate the ramp 70 from the support 20. Pull the second ramp section 100 out against the counter balance gas spring 134 to the point where the ramp 70 is in fully deployed position and at an angle or incline relative to the deck surface 212. It must be noted that the ramp support 20 allows pivoting about two different axes. The handle 132 facilitates ease of manually moving the second ramp section 100. The above described ramp 70 can be deployed in about 24 seconds.

Kneel Vehicle with Suspension 330

Note, once the second ramp section 100 is moved away from the first ramp section 74, the vehicle can kneel automatically to a height suitable to attain a desired ramp slope. In a non-limiting example to meet requirements of the US Americans With Disability Act (ADA), such ramp slop is approximately 1:6. In this non-limiting example the height of the deck surface 212 from the ground will be approximately 9½". The above described kneeling suspension 330 vehicle can kneel the vehicle 200 in about 26 seconds.

Boarding (Loading) and Securing a Non-Ambulatory Passenger in a Wheelchair

Use previously deployed ramp 70 to access vehicle deck surface 212 with wheelchair (not shown).

Secure wheelchair (not shown) using integrated wheelchair retaining devices 320 and/or 324. In this case, the rear of the wheelchair (not shown) is secured with an in deck retractors 320 (time 00:44) while the front is secured with an electrically operated retractors 324). The boarding time can be about 33 seconds with additional about 60 second needed to secure the wheelchair (not shown) with straps from wheelchair retaining devices 320 and/or 324. wheelchair retaining devices 320 and/or 324 can be also referred to in this document as wheelchair restraints 320 and/or 324

Use of the wheelchair retaining devices 320 and/or 324 has been found advantageous for use on vehicles 200, particularly, where the wheelchair retaining devices 324 are electrically actuated, thus eliminating a need for an operator of the vehicle 200 to reach into the void 258 and around the wheelchair (not shown) in order to activate the wheelchair retaining devices 324.

Fold Up the Ramp

With the wheelchair (not shown) being secured, move the second ramp section 100 toward the first ramp section 74 and pivot the ramp 70 into the intermediate vertical position along the side edge 114 so that the vehicle 200 can be driven with the wheelchair passenger in position. The above described ramp 70 can be folded in about 67 seconds System Interlocks With the ramp 70 retuned to the intermediate vertical position, two optional vehicle interlocks, when provided, change state. First, the front retractors 324 are locked regardless of the position of the retractor control switch. Doing so can prevent exposure of the wheelchair occupant to the positionally hazardous situation posed by the vehicle operator leaving the front retractors 324 in extended positions.

Barrier Alarm

To minimize the possibility of operator error with regard to the position of the offside barrier 270 and the status of the ramp 70, an optional warning system can be provided. In an event that the ramp 70 "unfolds" (i.e. the ramp 70 is no longer folded or in a stowed position) and the offside barrier 270 is not deployed or is not in a first position, the operator will receive a warning, for example such a visual and/or audible warning. The total time needed to activate interlocks and provide annunciation can be achieved in about 30 seconds.

Deboarding a Wheelchair

Method of deboarding or unloading the non-ambulatory individual from the LSV 200 essentially comprises the same steps in reverse and its description will be omitted in this document for the sake of brevity. The deboarding time may take about 80 seconds.

Figure 15:
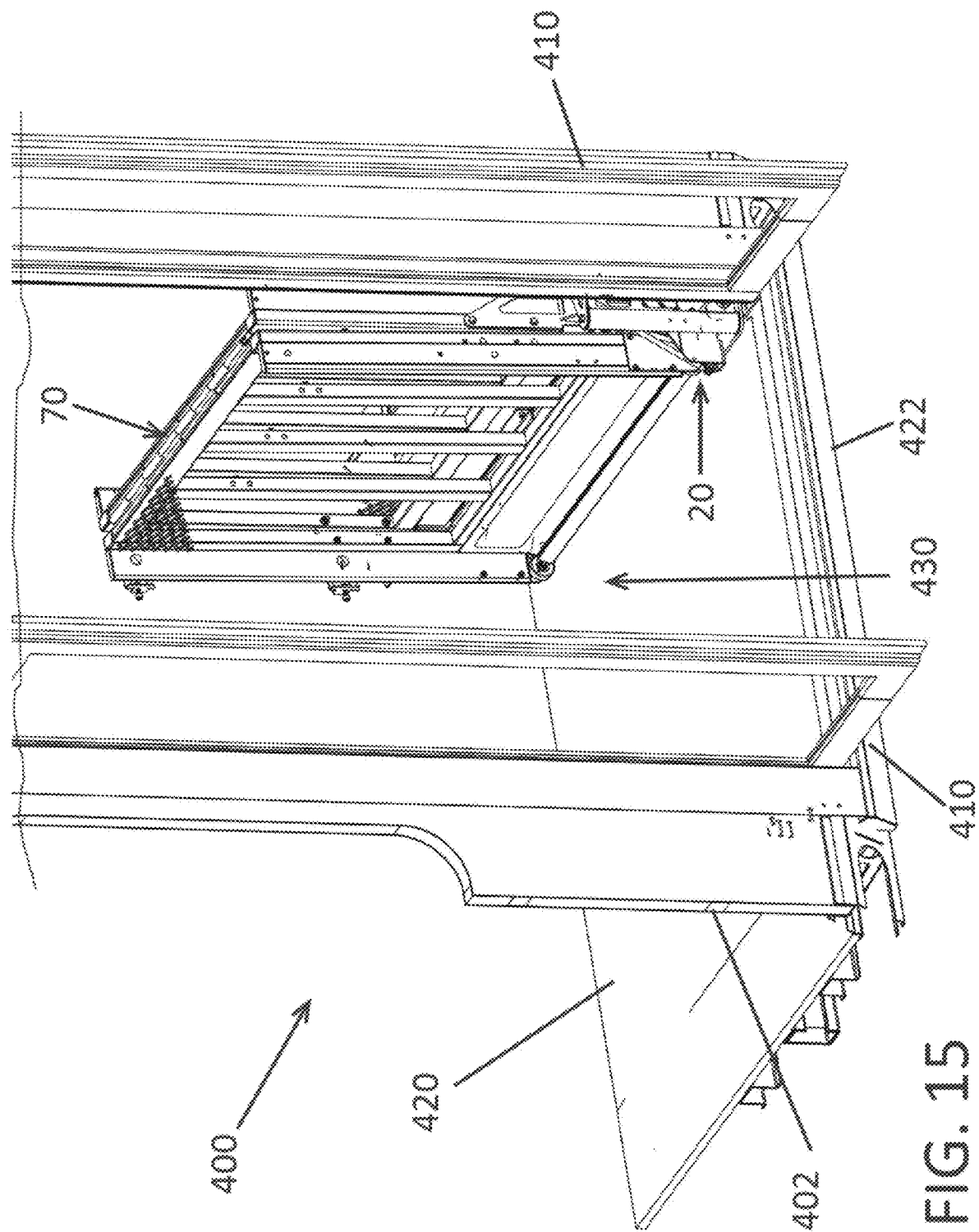
FIG. 15 illustrates a perspective view of an exemplary ramp assembly with the ramp being in a folded stowed or an intermediate position within a vehicle, partially illustrated.
Figure 16:
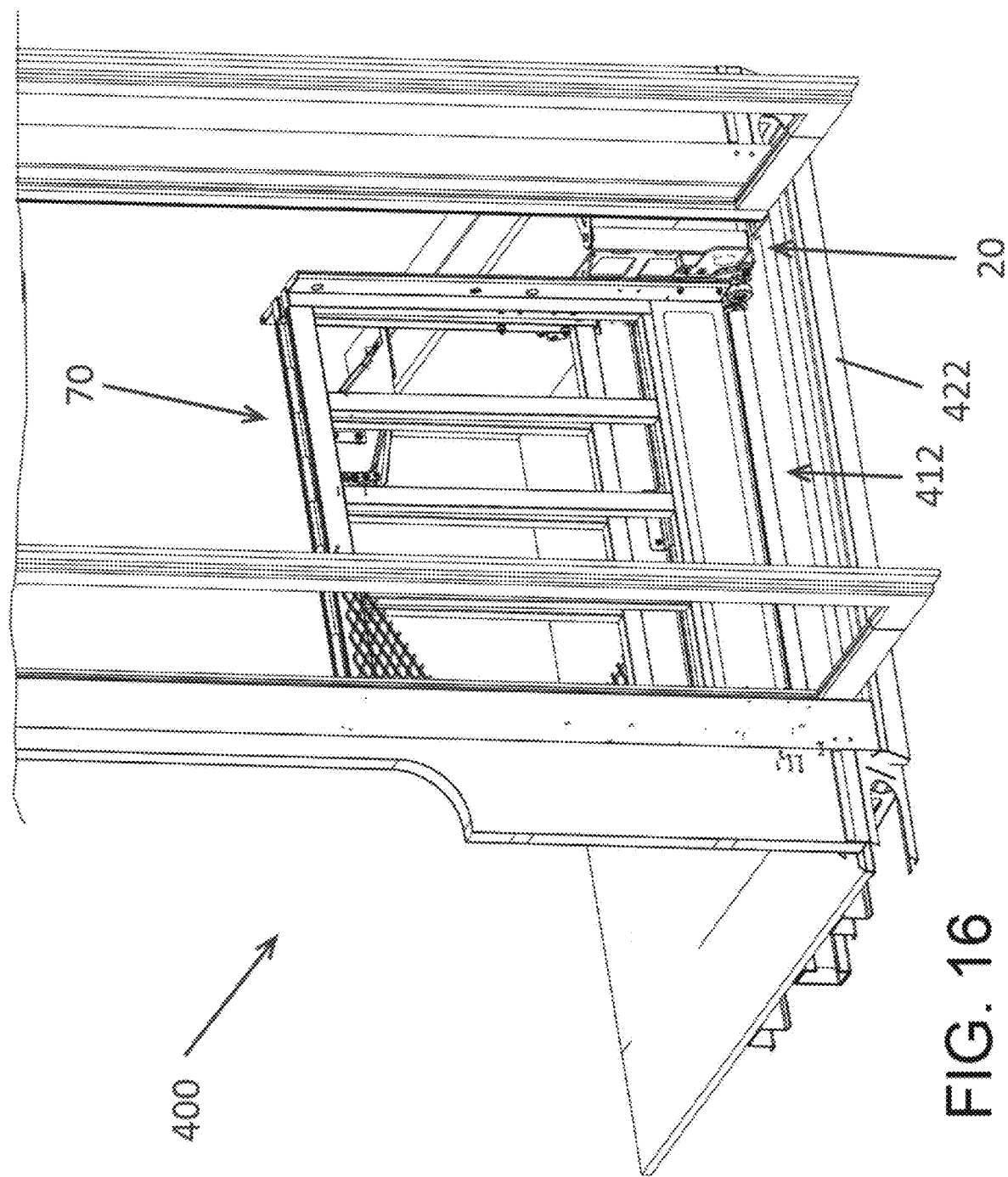
FIG. 16 illustrates a perspective view of an exemplary ramp assembly of FIG. 15 with the ramp being in the intermediate position within a vehicle, partially illustrated.
Figure 17:
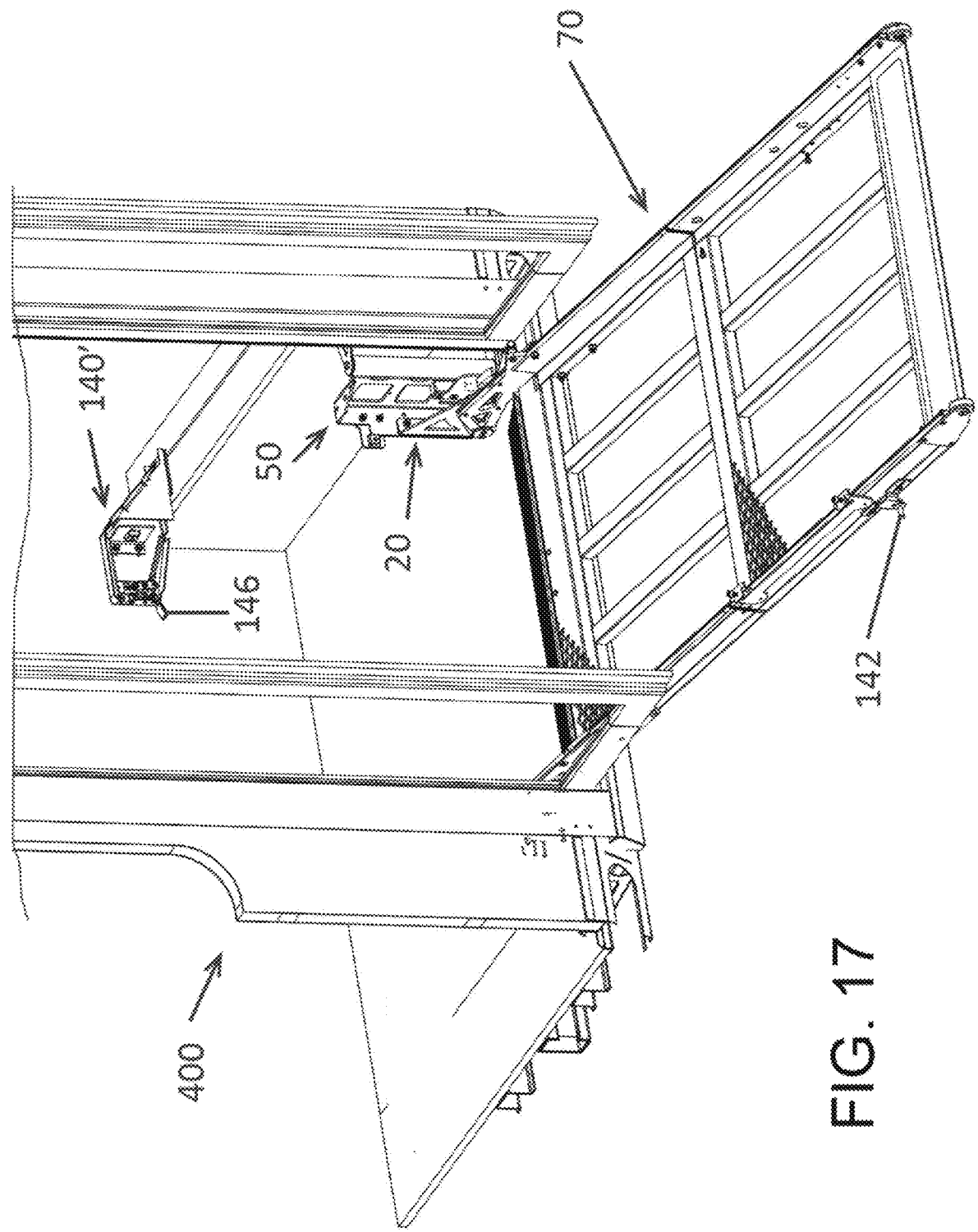
FIG. 17 illustrates a perspective view of the ramp assembly of FIGS. 15-17 with the ramp being in unfolded deployed position.

FIGS. 15-17 illustrate an embodiment wherein the above described ramp assembly 10 is installed within a vehicle 400 that comprises door(s) 410. Such vehicle 400 can be any one of a bus, a minivan, a van, a recreational vehicle (RV) and the like passenger or individual transportation vehicle. The vehicle 400 further comprises a floor surface 420 with a side edge 422. Door(s) 410 can be provided within a side ingress/egress (door) opening 412 incorporating the side edge 422 or within an end door opening (not shown). The ramp assembly 10 is installed within a cavity or a cabin 430 adjacent the door(s) 410. As is best shown in FIG. 17, the ramp 70 can be inset inwardly from the side edge 422 while in the intermediate folded position to allow closed doors 410 be generally flush with the exterior 402 of the vehicle 400. In other words, a surface of the ramp 70 being in the intermediate folded position does not has to be flush with the side edge 422 of the vehicle 400. Furthermore, as best shown in FIG. 17 the latch assembly 140, referenced as 140', can be affixed to the vehicle structure inwardly from the door(s) 410 and remotely from the support 20. In this position the pin 142 will be disposed on the opposite side of the second ramp portion 100 to engage the latch assembly 140'.

The method of onboarding (loading) or unboarding (unloading) non-ambulatory individual(s) will be essentially identical to the above described methods and will be omitted herewithin for the sake of brevity. However, it will be understood, that the side barrier 270 will not be required.

Figure 18:
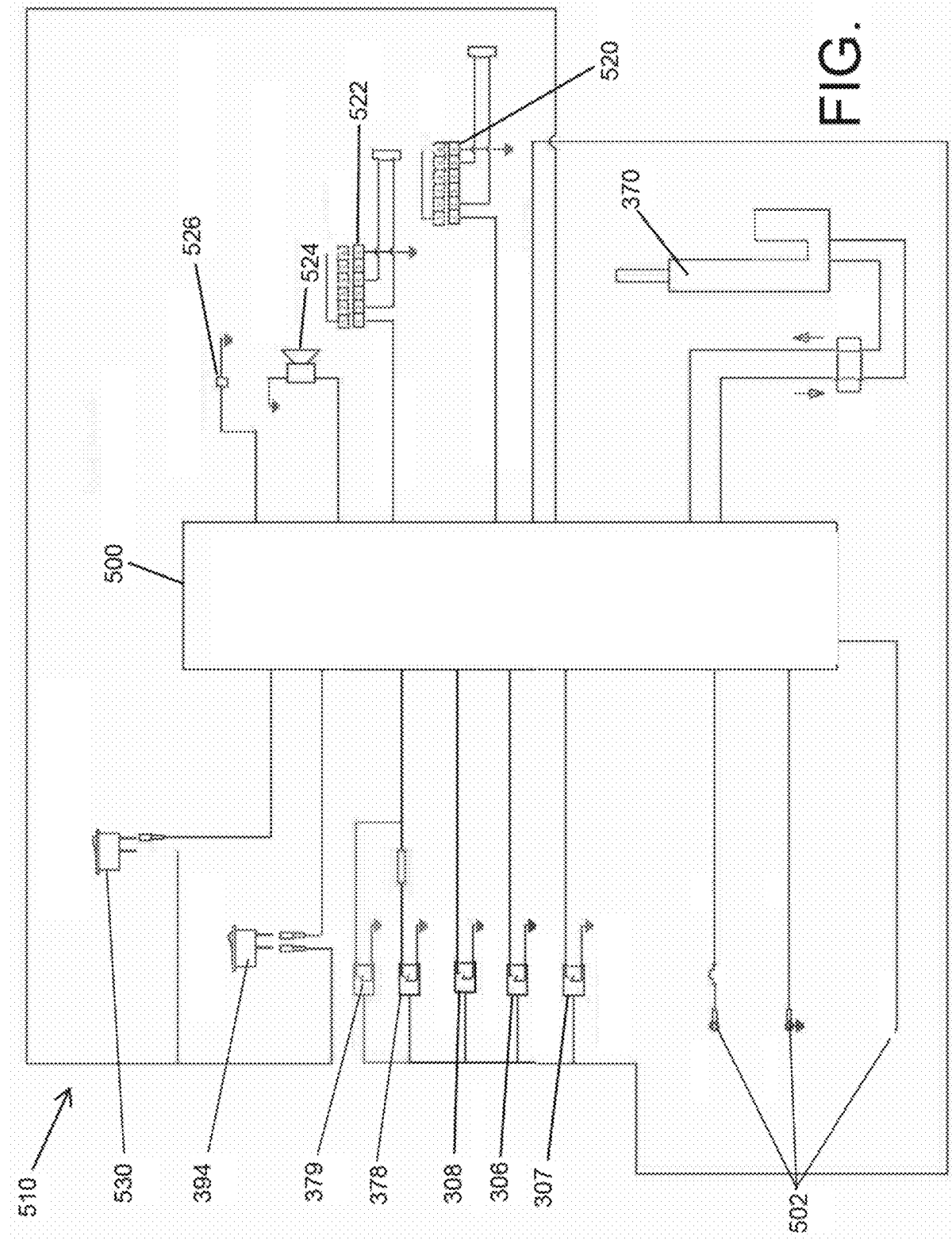
FIG. 18 illustrates an exemplary control block diagram.

Additional disclosure of optional components of either embodiment is provided below in a reference to the control circuit 510 of FIG. 18.

As described above, the operation of the ramp 70, the barrier 270 and the kneeling mechanism 330 can be controlled with the controller 500. Controller 500 can be powered from the vehicle electric system (not shown) through connections 502.

A series of inputs to the controller 500 and outputs therefrom are related to the position of the manually operated ramp 70, the position of the manually operated off-side barrier 270 and the kneeling suspension 330.

To communicate that the ramp 70 is unfolded, a switch 306 (the Ramp Fold switch) is mounted on the support 20 and connected to the controller 500. The Ramp Fold switch 306 can be of a proximity sensor type but can be also provided as a lever operated limit switch. When the ramp 70 is folded, the Ramp Fold switch 306 is configured to be in a closed state, i.e. generating an electric output signal. The Ramp Fold Switch 306 is mounted on the latch bracket 141 of the support 20, as is best shown in FIGS. 3B, 4B and 4E, and senses a portion of the ramp 70. The Ramp Fold Switch 306 can be configured such that the switch contacts are closed upon sensing the ramp 70, thus changing the controller ramp fold input to HIGH. Accordingly, unfolding the ramp 70 opens the Ramp Fold Switch 306 and changes the controller ramp fold input to LOW, signaling to the controller, among other things, to power the actuator 370 to effect vehicle kneeling. The controller 500 can be programmed to define the ramp unfolded condition as soon as the Ramp Fold Switch 306 no longer senses the ramp 70.

When the ramp 70 is returned to its vertical position, the Ramp Fold switch 306 is closed, signaling to the controller 500 to extend the actuator returning the vehicle 200 to its normal ride height.

In addition to the kneeling "on" and "off" switch 394 and the Ramp Fold switch 306, the system can be also equipped with switches that sense the position of the actuator and provide feedback to the controller 500. The Kneeling Home switch 378, when closed, indicates that the vehicle 200 suspension 220 is at its normal ride height. The Kneeling Position switch 379, when closed, indicates that the vehicle suspension 220 is fully compressed and the vehicle 200 is fully kneeled. The input states from these switches is used by the controller 500 to determine when electric power to the actuator 370 should be provided or discontinued. One or the both of the Kneeling Home switch 378 and Kneeling Position switch 379 can be of a proximity sensor type. The Kneeling Home switch 378 and Kneeling Position switch 379 can be mounted within or one the housing 340 or can be mounted within the suspension 220 and/or deck 210 to sense for example a clamp 260 or a target (not shown) on the chain 380.

When the ramp 70 is deployed and/or the vehicle is kneeled, the system controller 500 provides vehicle interlock(s) that will prevent the vehicle from being moved. In the event of system component failure, the vehicle interlock can be over ridden by a trained operator to enable the vehicle to be moved when it otherwise wouldn't be able to. As a further point, in the event the vehicle interlock override is activated, it will be automatically reset when the vehicle ignition switch is powered off and back on again.

A vehicle interlock relay 520 can be provided to prevent the vehicle 200 from moving unless the ramp 70 is in the appropriate stowed or intermediate position. The vehicle interlock relay 520 is configured to normally provide a closed circuit to the vehicle's operating system (not shown). When the controller 500 energizes coil of the vehicle interlock relay 520, the relay contacts are open and the circuit is OPEN which prevents the vehicle from moving. The vehicle interlock relay 520 signal can be generally provided when Ramp Fold Switch 306 is OPEN, Ramp Pivot Switch 307 is OPEN, and Interlock Over-ride Switch 530 is OFF (OPEN). Interlock Over-ride Switch 530 can be mounted within or on a dashboard A wheelchair restraint interlock relay 522 can be provided to prevent the release of wheelchair restraint retractors 324 unless the ramp 70 is in the appropriate position. The Wheelchair Restraint interlock relay 522 can be configured to provide a normally OPEN circuit to disable operation of the front, electric retractors of the wheelchair restraint system. When the controller 500 energizes the relay coil, the circuit is CLOSED which enables operation of the retractors 324.

The wheelchair restraint interlock relay signal can be generally provided when Ramp Fold Switch 306 is OPEN and Ramp Pivot Switch 307 is CLOSED.

A piezoelectric buzzer 524 can be provided to issue an audible alarm, indicating that the ramp 70 or off-side barrier 270 may not be in position appropriate for vehicle operation. The piezoelectric buzzer 524 can be configured to output Fast pulse (about 0.1 seconds ON/about 0.5 seconds OFF) when Barrier Switch 308 is OPEN and Ramp Fold Switch 306 is Open. The piezoelectric buzzer 524 can be configured to output Slow pulse (about 0.1 seconds ON/about 1.5 seconds OFF) when Interlock Over-ride switch 530 is ON (Closed or activated). If more than one of the above conditions exists, "Fast Pulse" can have priority.

A Visual Indicator 526, such as an LED or an equivalent, can be provided to indicate that the ramp 70 or off-side barrier 270 may not be in a position appropriate for vehicle operation. The Visual Indicator 526 can be configured to output a Fast pulse (about 0.1 seconds ON/about 0.5 seconds OFF) when Barrier Switch 308 is OPEN and Ramp Fold Switch 306 is Open. The Visual Indicator 526 can be configured to output a Slow pulse (about 0.1 seconds ON/about 1.5 seconds OFF) when Interlock Over-ride switch 530 is ON (Closed). The Visual Indicator 526 can be configured to output a Continuous ON when the Kneeling Home switch 378 is OPEN. If more than one of the above conditions exists, the priority order for the audible warning can be Continuous, "Fast Pulse", and Any other.

Kneeling ON/OFF Rocker type, ON/OFF switch 394 can be located on the vehicle dashboard 328. In the OFF position, the vehicle suspension will NOT kneel when the ramp is unfolded.

Interlock Over-ride Switch Toggle type, ON/OFF switch 530 can be located either on the dashboard 328, in the glove box (not shown) or in the engine compartment (not shown). The interlock over ride switch 530 is provided in the event of system failure such that the vehicle interlock cannot be released. In the event the interlock over ride switch is ON, an audible and visual warning is provided. It is desired that the audible and visual warning for the interlock over-ride is different from that associated with the off-side barrier switch.

It is to be noted that switches 306, 307, 308, 378, and 379 can be provided as lever operable limit switches or in any other switch type.

NOTE: The Interlock override is automatically reset to normal mode with each "key-on" event to prevent operators from inadvertently leaving the vehicle interlock engaged.

Additional structure and operation of the exemplary vehicle kneeling system 330 and method can be further explained as:

1. Background

To facilitate access to the vehicle loading deck, a ramp is provided. In the interest of ensuring maximum maneuverability for the widest range of mobility aid types and passenger/operator skill levels, the lowest slope practicable is desirable as it enables the passenger/operator to use the upper area of the ramp as a maneuvering surface.

2. User Selectable

In the event the vehicle is parked adjacent a curb such that the kneeling feature is not required to provide the lowest slope practicable, the kneeling feature can be disabled by the vehicle operator. Accordingly, with the kneeling switch in the "off" position, when the ramp is deployed, the vehicle suspension will not be pulled down.

3. Kneeling Activation

As can be seen in the wiring schematic, the force required to "pull" the vehicle suspension is provided by an electromechanical, linear actuator. Power for the electromechanical, linear actuator is provided by a system controller. When kneeling is enabled (ie the kneeling feature is turned "on") and the ramp 70 is unfolded, the actuator will retract, deflecting the vehicle suspension in much the same way as would be caused by very large vehicle load.

To communicate that the ramp is unfolded, a proximity type sensor (the Ramp Fold switch) 306 is mounted to the ramp 70 and electrically connected to the controller 500. When the ramp 70 is folded, the switch is closed. Accordingly, unfolding the ramp 70 opens the switch 306, signaling to the controller, among other things, to power the actuator to effect vehicle kneeling.

Actuator Retract function executed by the controller 500 provides timed power to linear actuator 370 to pull-down vehicle suspension 220. A timer can be set within the controller 500 to achieve initial time of about 7 seconds. The linear actuator 370 shall retract until the Kneeling Position Switch 379 is reached, or until the system times out. The Kneeling On/Off switch 394 should be "ON", the Ramp Pivot Switch 307 should be "closed" and the Ramp Fold Switch 306 should be OPEN.

4. Return to Normal Ride Height

When the ramp 70 is returned to its vertical stowed position, the Ramp Fold switch 306 is closed, signaling to the controller 500 to extend the actuator 370 returning the vehicle to its normal ride height. Actuator Extend function within the controller 500 provides time power to linear actuator 370 to return the vehicle suspension 220 to normal ride height. A timer can be set within the controller 500 to achieve initial time of about 7 seconds. The linear actuator 370 shall extend until the Kneeling Home Switch 378 is reached, or until the system times out. The Ramp Fold Switch 306 should be CLOSED, and the Kneeling Home Switch 378 should be OPEN. It must be noted that if the system does not "Close" the Kneeling Home Switch 378 within the prescribed time period, Visual and Audible indicator can be activated.

5. Kneeling Control

In addition to the kneeling "on" and "off" and the "Ramp Fold" switches, the system is also equipped with switches that sense the position of the actuator and provide feedback to the system controller. The Kneeling Home switch 378, when closed, indicates that the vehicle is at its normal ride height. The "Kneeling Position" switch 379, when closed, indicates that the vehicle is fully kneeled. The information from these switches is used by the controller to determine when electric power to the actuator should be cut.

6. Vehicle Interlock and Interlock Override

When the ramp 70 is deployed and/or the vehicle 200 is kneeled, the controller 500 provides a vehicle interlock that will prevent the vehicle from being moved. In the event of system component failure, the vehicle interlock can be over ridden by a trained operator to enable the vehicle to be moved when it otherwise wouldn't be able to. As a further point, in the event the vehicle interlock override is activated, it will be automatically reset when the vehicle ignition switch is powered off and back on again.

It would be understood that the above described components can be provided as an accessibility kit 600 for a field retrofit of vehicles already in use or to be installed onto a vehicle 200 during an assembly thereof. The accessibility kit 600 comprises a support 20. The support 20 can comprise a mount configured to mount to a portion of the vehicle and defining a vertical axis of rotation, a bracket 50 secured to the mount, the bracket 50 configured to rotate about the vertical axis of rotation 32 and define a horizontal axis 34 of rotation, and a ramp latch opening 144 provided in the bracket. The kit 600 further comprises a ramp 70. The ramp 70 comprises a first ramp section 74 comprising one end thereof being configured to mount to the bracket for a rotation about the horizontal axis of rotation, a wheel mounted on the first ramp section and extending from the from the first end thereof to contact the portion of the vehicle during operation of the ramp, a ramp sensor target mounted on the first ramp section, a second ramp section 100, a hinge operatively coupling an opposite end of the first ramp section to one end of the second ramp section, and the second ramp section movable, during use of the ramp 70 between a generally folded stowed position being disposed in a surface-to-surface facing arrangement with the first ramp section and a deployed unfolded position being disposed in an end-to-end facing arrangement with the first ramp section and defining an inclined ramp surface during the operation of the ramp. Additional components of the kit 600 can include a ramp latch pin extending from an edge surface of the second ramp section, the ramp latch pin engaging the ramp latch opening when the ramp is latched to the support bracket in a stowed position; a barrier retaining member mounted on the second ramp section; a handle attached to the edge surface of the second ramp section; a counterbalance device having one end thereof being coupled to the bracket and having a longitudinally opposite end thereof being coupled to the first ramp section, the counterbalance device configured to aid in a pivoting movement of the second ramp section away from and toward to the first ramp section; a latch configured to latch the ramp to the support; a latch release device mounted on the bracket; and a ramp sensor configured to sense the ramp sensor target when the ramp being latched to the support. When the kit 600 is to be provided for a utility vehicle, such as a club cart, the kit 600 can further comprise a barrier 270 comprising one end thereof being configured to mount, on a portion of the vehicle, for a pivoting movement in a vertical plane between a first position where the barrier is disposed along one side edge of the vehicle and a second position where the barrier is disposed coplanar to the ramp being disposed in the generally vertical folded stowed position; a second barrier retaining member mounted to another portion of the vehicle; a barrier latch mounted on an opposite end of the barrier, the barrier latch configured to selectively engage and disengage the first barrier retaining member or the second barrier retaining member; and a barrier sensor configured to sense a presence or an absence of the barrier in a position being latched to the second barrier retaining member.

Additionally, the accessibility kit 600 can be configured to enable a movement of a wheelchair and can further comprise optional wheelchair restraints 320, 324 with retractable straps. The restraint 320 is provided as a deck mounted restraint, where the top surface of the restraint 320 is generally flush with the vehicle deck Additionally, the accessibility kit 600 is configured to enable a movement of a wheelchair onto a from a deck and can further comprise a kneeling mechanism configured to pivot a portion of the deck between a position where one edge thereof is being lower in a vertical plane than an opposite side edge of the deck and a position when the one side edge and the opposite side edge are disposed generally equal in the vertical plane.

It would be also understood that the ramp 70 is provided to fit into available height envelope, as vehicle 200 is generally adapted with a roof or a protective canopy. On vehicles without such roof or a protective canopy, a nonramp can be employed with the support 20 being adapted to accommodate a taller single ramp portion.

Figure 21:
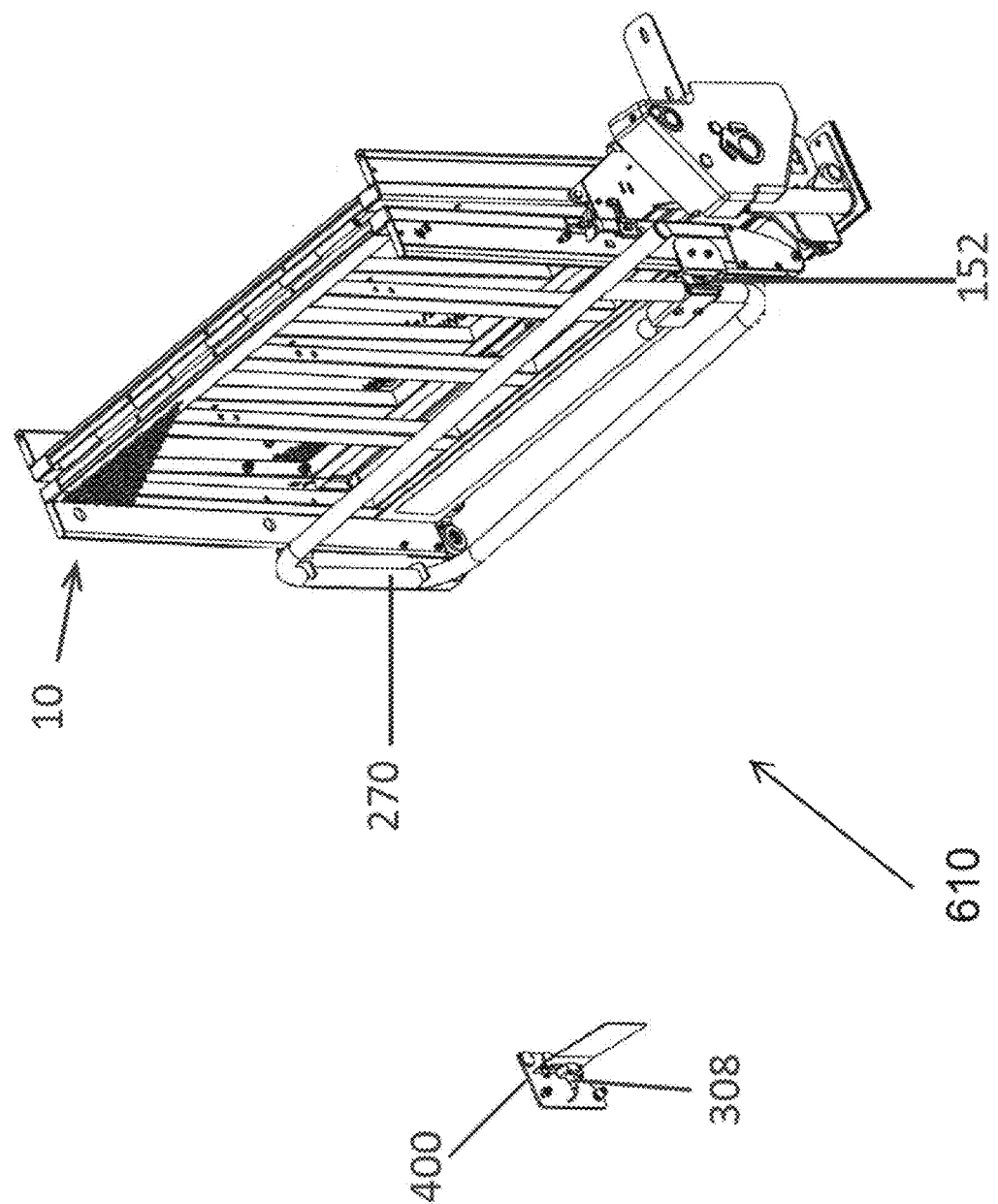
FIG. 21 illustrates a perspective view of an exemplary accessibility kit.
Figure 22:
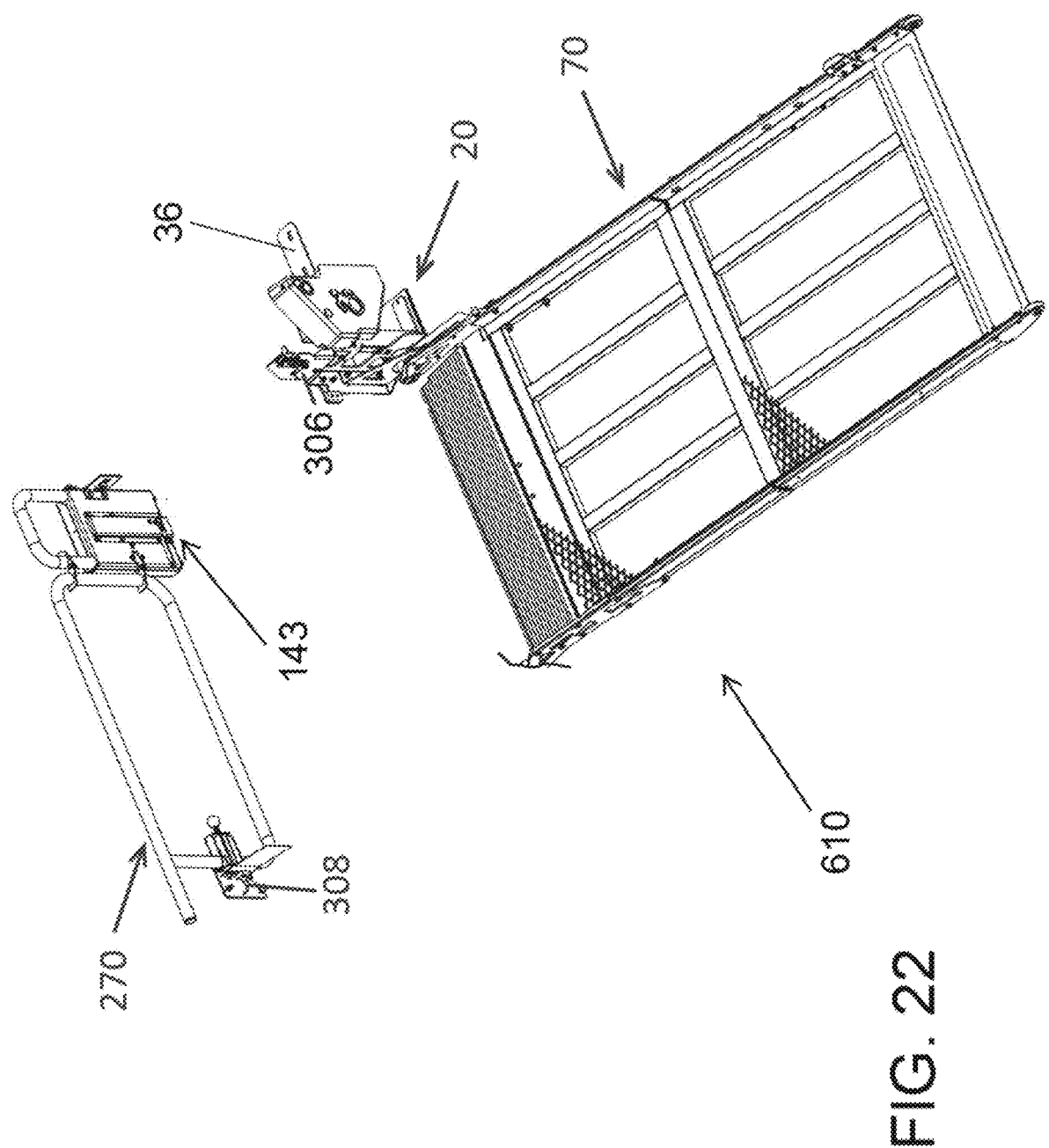
FIG. 22 illustrates another perspective view of the accessibility kit of FIG. 21.

In an embodiment of FIGS. 21-22, therein is provided an accessibility kit 610 for a vehicle 200 that does not require a kneeling mechanism 330 and wheelchair restraints 320 and 324.

It will be also understood that the kit 600 or 610 without the barrier 270 can be installed on vehicles 400 where the ramp 70 is disposed normal to a length of the vehicle 400 when is in deployed position.

In an embodiment where the vehicle 200 is a UTV, it may be acceptable to store the ramp 70 in the above described intermediate position, as such UTV is to be used by a single user. In this configuration, the support will be simplified to eliminate rotation about the vertical axis 32. The barrier 270 can be also provided as a movable barrier described above or can be provided as a stationary barrier.

In an embodiment, a vehicle 200, 400 only comprises the ramp assembly 10.

In an embodiment, a vehicle 200 comprises the ramp assembly 10 and the barrier 270.

In an embodiment, a vehicle 200 comprises the ramp assembly 10, the barrier 270, and the controller 500 electrically coupled to at least one of sensors, interlocks and annunciators.

In an embodiment, a vehicle 200 comprises the ramp assembly 10, the barrier 270, the kneeling mechanism 330, and the controller 500 electrically coupled to at least one of sensors, interlocks and annunciators.

In an embodiment, a vehicle 200 comprises the ramp assembly 10, the kneeling mechanism 330 and the controller 500 electrically coupled to at least one of sensors, interlocks and annunciators.

In an embodiment, a vehicle 400 comprises the ramp assembly 10 and a latch assembly 146 mounted within the interior of the vehicle 400 to selectively latch and unlatch the ramp assembly in the stowed position.

In an embodiment the support 20 can comprise both the mount 38 and the ramp lifting assembly 40.

In an embodiment, a low speed vehicle 200 comprises a barrier, the barrier configured to be manually positioned on the deck in a first position where the barrier is disposed along an opposite side edge of the deck between the front seat and the at least one rear seat or configured to be manually positioned in a second position where the barrier is disposed coplanar to the ramp being in the generally vertical folded stowed position.

In an embodiment, a low speed vehicle 200 comprises a barrier, the barrier configured to be manually positioned on the deck in a first position where the barrier is disposed along an opposite side edge of the deck, between the front seat and the at least one rear seat, when the ramp is being in the deployed unfolded position or being in the generally vertical folded intermediate position, the barrier being also configured to be manually positioned in a second position remotely from the ramp being in the generally vertical folded stowed position.

In an embodiment, a method is provided for selectively transporting ambulatory and non-ambulatory users on an electric or a combustion-powered utility vehicle, the electric or the combustion-powered utility vehicle comprising a deck, an electric motor or a combustion engine coupled to the deck and configured to propel the deck, a steering assembly for steering the electric or the combustion-powered utility vehicle, and at least one rear seat mounted on the deck for carrying one or more users and a front seat mounted on the deck for carrying one or more users and a defining a void with the at least one rear seat. The method comprises the steps of mounting a personal mobility vehicle access module in the void, the personal mobility vehicle access module comprising a support secured to a portion of the vehicle and a ramp coupled to the support, the ramp movable on the support between a generally vertical folded stowed position behind the front seat in a direction generally normal to a length of the deck, a unfolded deployed position defining an inclined ramp surface, and a generally vertical folded intermediate position along one side edge of the deck; positioning the ramp in the generally vertical folded stowed position behind the front seat when carrying only ambulatory users; manually positioning the ramp in the unfolded deployed position for enabling loading or unloading of non-ambulatory user(s); and manually positioning the ramp in the generally vertical folded intermediate position for carrying the non-ambulatory user(s) being positioned within the void on the deck during movement of the electric or the combustion-powered utility vehicle.

A feature of this embodiment is that the method can further comprise a step of securing, with retractable straps, the non-ambulatory user(s) being seated in personal mobility vehicle and being carried on the electric or the combustion-powered utility vehicle.

A feature of this embodiment is that the method can further comprise a step of mounting housings for the retractable straps within a thickness of the deck so that a top surface of each housing is being generally flush with a top deck surface of the deck.

A feature of this embodiment is that the method can further comprise a step of mounting a barrier on the deck for a movement between a first position where the barrier is disposed along an opposite side edge of the deck and a second position where the barrier is disposed coplanar to the ramp being in the generally vertical folded stowed position, a step of moving the barrier into the first position when positioning the ramp in the unfolded deployed position for enabling egress or ingress of non-ambulatory user(s) or positioning the ramp in the generally vertical folded intermediate position for carrying the non-ambulatory user(s) being present on the deck during movement of the electric or the combustion-powered utility vehicle and a step of moving the barrier into the second position when positioning the ramp in the generally vertical folded stowed position behind the front seat.

In an embodiment, an accessibility kit for a vehicle comprises a support comprising a mount configured to mount to a portion of the vehicle and defining a vertical axis of rotation, a bracket secured to the mount, the bracket configured to rotate about the vertical axis of rotation and define a horizontal axis of rotation, and a ramp latch opening provided in the bracket; a ramp comprising a first ramp section comprising one end thereof being configured to mount to the bracket for a rotation about the horizontal axis of rotation, a wheel mounted on the first ramp section and extending from the from the first end thereof to contact the portion of the vehicle during operation of the ramp, a ramp sensor target mounted on the first ramp section, a second ramp section, a hinge operatively coupling an opposite end of the first ramp section to one end of the second ramp section, and a second ramp section manually movable between a generally folded stowed position being disposed in a surface-to-surface facing arrangement with the first ramp section and a unfolded deployed position being disposed in an end-to-end facing arrangement with the first ramp section and defining an inclined ramp surface during the operation of the ramp; a ramp latch pin extending from an edge surface of the second ramp section, the ramp latch pin engaging the ramp latch opening when the ramp is latched to the support bracket in a stowed position; a barrier retaining member mounted on the second ramp section; a handle attached to the edge surface of the second ramp section; a counterbalance device having one end thereof being coupled to the bracket and having a longitudinally opposite end thereof being coupled to the first ramp section, the counterbalance device configured to aid in a pivoting movement of the second ramp section away from and toward to the first ramp section; a latch configured to latch the ramp to the support; a latch release device mounted on the bracket; a ramp sensor configured to sense the ramp sensor target when the ramp being latched to the support; a barrier comprising one end thereof being configured to mount, on a portion of the vehicle, for a pivoting movement in a vertical plane between a first position where the barrier is disposed along one side edge of the vehicle and a second position where the barrier is disposed coplanar to the ramp being disposed in the generally vertical folded stowed position; a second first barrier retaining member mounted to another portion of the vehicle; a barrier latch mounted on an opposite end of the barrier, the barrier latch configured to selectively engage and disengage the first barrier retaining member or the second barrier retaining member; and a barrier sensor configured to sense a presence or an absence of the barrier in a position being latched to the second barrier retaining member.

A feature of this embodiment is that the accessibility kit is configured to enable a movement of a wheelchair and further comprising wheelchair restraints with retractable straps.

A feature of this embodiment is that the accessibility kit further comprises a kneeling mechanism configured to couple to a rear axle of the vehicle and operable to selectively move one longitudinal side of a vehicle deck toward to and away from the rear axle A feature of this embodiment is that the accessibility kit is configured to enable a movement of a wheelchair onto and from a deck and further comprising a kneeling mechanism configured to pivot a portion of the deck between a position where one edge thereof is being lower in a vertical plane than an opposite side edge of the deck and a position when the one side edge and the opposite side edge are disposed generally equal in the vertical plane.

In an embodiment, a kneeling mechanism for a door-less electric or a combustion-powered utility vehicle comprises a housing that is rigidly mounted to a vehicle deck with a pair of brackets; an axle clamp being suspended from the housing; and an actuator being supported by the housing, the actuator is being connected with the clamp through a chain and a sprocket; and the actuator is selectively operable, during kneeling operation, to reduce a ride distance between the clamp and the housing, pulling the deck toward the axle and return the ride distance to a ride position.

In an embodiment, a wheelchair restraint system for a door-less electric or a combustion-powered utility vehicle comprises a pair of first wheelchair restraints, each first wheelchair restraint from the pair of first wheelchair restraints comprises a housing configured for mounting on a deck surface of the vehicle and a strap mounted for extension therefrom and retraction thereinto, the strap comprising a hook on a free end thereof; and a pair of second wheelchair restraints, each second wheelchair restraint from the pair of second wheelchair restraints comprises a housing configured for mounting within a deck thickness of the vehicle so that a top surface of the each second wheelchair restraint is generally flush with a deck surface of the vehicle and a strap mounted for extension therefrom and retraction thereinto, the strap comprising a hook on a free end thereof.

In an embodiment, a vehicle comprises a deck comprising an upper surface, a suspension assembly and wheels; a motive power member coupled to the deck and configured to move the deck; a steering assembly configured to steer the low speed vehicle; a seat mounted on the upper surface of the deck, the seat configured to seat one or more users; a cavity on the deck adjacent the seat, the cavity in an open communication with an environment external to the deck; and a personal mobility vehicle access module mounted in the cavity, the personal mobility vehicle access module comprising a support and a ramp coupled to the support, the ramp manually pivotable on the support between a generally vertical folded stowed position within the cavity, a unfolded deployed position external to the deck, the unfolded deployed position defining an inclined ramp surface between a ground and the upper surface, and a generally vertical folded intermediate position along one side edge of the deck.

In an embodiment, a vehicle comprises a movable structure; an interior cavity above a floor surface and a side opening in the movable structure; and a personal mobility vehicle access apparatus comprising a support mounted in the cavity and a ramp coupled to the support, the ramp pivotally and manually movable on the support between a generally vertical folded stowed position within the interior cavity, a unfolded deployed position external to the movable structure, the unfolded deployed position defining an inclined ramp surface, and a generally vertical folded intermediate position inset into the cavity from the side opening.

In an embodiment, in a combination with a vehicle having a frame, a floor, a generally rectangular door opening and an interior cavity in a communication with the floor and the door opening; a personal mobility vehicle access apparatus comprising a support mounted in said cavity and a ramp coupled to said support, said ramp pivotally movable on said support between a generally vertical folded stowed position within said interior cavity, a unfolded deployed position external to the frame, said unfolded deployed position defining an inclined ramp surface between a ground and the floor, and said intermediate position at least partially covering the door opening.

In an embodiment, a wheelchair ramp system comprises a vehicle comprising a vehicle body including a floor with a floor surface, a passenger side and a driver side, an ingress/egress opening formed in at least one of said passenger and driver sides, said vehicle body defining a vehicle cabin accessible by said opening, said vehicle cabin having a front seat positioned in a front seat area and a rear seat positioned in a rear seat area contained therein; and a wheelchair apparatus comprising a support mounted in said vehicle cabin adjacent said opening and a ramp coupled to said support, said ramp pivotally movable on said support between a generally vertical folded stowed position within said vehicle cabin, an unfolded deployed position external to said vehicle cabin, said unfolded deployed position defining an inclined ramp surface between said floor surface and a ground, and a generally vertical folded intermediate position within or near said ingress/egress opening.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

It should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described subject matter has industrial applicability.

What is claimed is:

1. A device, comprising:
an inclined curved surface;
a generally planar surface terminating the inclined curved surface at one end of the device; and
a roller having an exterior surface thereof configured to roll on the generally planar surface and on the inclined curved surface;
the device designed to lift a vehicle ramp attachable to a support in a response to the vehicle ramp rotating about the support.

2. The device of claim 1, further comprising:
a first member including at least elongated slots spaced apart from each other and being oriented in a first direction;
a second member, the second member at least including elongated slots spaced apart from each other and being oriented in a second direction, the second direction being generally perpendicular to the first direction, each of the elongated slots in the second member is oriented to overlap a respective elongated slot in the first member; and
a third member positionable between surfaces of the first and second members, the third member comprising threaded studs, each threaded stud being passed through a respective elongated slot in the first member and in the second member.

3. A ramp support assembly, comprising:
a ramp support including at least a first pivot and a second pivot; and
a device connected to the ramp support, the device including:
a first member at least including elongated slots spaced apart from each other and being oriented in a first direction,
a second member, the second member at least including elongated slots spaced apart from each other and being oriented in a second direction, the second direction being generally perpendicular to the first direction, each of the elongated slots in the second member is oriented to overlap a respective elongated slot in the first member, and
a third member positionable between surfaces of the first and second members, the third member comprising threaded studs, each threaded stud being passed through a respective elongated slot in the first member and in the second member;
the device designed to account for a deflection of a ramp connectable to one of the first and second pivots.

4. The ramp support assembly of claim 3, wherein the device is designed to preload an end of one of the first and second pivots.

5. The ramp support assembly of claim 3, wherein the device is designed to offset an end of one of the first and second pivots.

6. The ramp support assembly of claim 3, wherein the device further comprises:
an inclined curved surface;
a generally planar surface terminating the inclined curved surface at one end of the device; and
a roller rotationally supported by the ramp support, the roller having an exterior surface thereof configured to roll on the generally planar surface and on the inclined curved surface.

7. The ramp support assembly of claim 3, further including the ramp.

8. A device, comprising:
a first member at least including first elongated slots spaced apart from each other and being oriented in a first direction;
a second member, the second member at least including second elongated slots spaced apart from each other and being oriented in a second direction, the second direction being generally perpendicular to the first direction, each second elongated slot from the second elongated slots in the second member is oriented to overlap a respective first elongated slot in the first member; and
a third member positionable between surfaces of the first and second members, the third member comprising threaded studs, each threaded stud being passed through a respective first elongated slot in the first member and a respective second elongated slot in the second member;
the device configured to account for a deflection of a rotating ramp in a vehicle.

9. The device of claim 8, further comprising:
an inclined curved surface;
a generally planar surface terminating the inclined curved surface at one end of the device; and
a roller having an exterior surface thereof configured to roll on the generally planar surface and on the inclined curved surface.

10. A ramp support assembly, comprising:
a support at least including a first pivot and a second pivot; and
a device connected to the support, the device including:
an inclined curved surface,
a generally planar surface terminating the inclined curved surface at one end of the device, and
a roller having an exterior surface thereof configured to roll on the generally planar surface and on the inclined curved surface.

11. The ramp support assembly of claim 10, wherein the device further comprises:
- a first member at least including elongated slots spaced apart from each other and being oriented in a first direction;
- a second member, the second member at least including elongated slots spaced apart from each other and being oriented in a second direction, the second direction being generally perpendicular to the first direction, each of the elongated slots in the second member is oriented to overlap a respective elongated slot in the first member; and
- a third member positionable between surfaces of the first and second members, the third member comprising threaded studs, each threaded stud being passed through a respective elongated slot in the first member and in the second member.

12. The ramp support assembly of claim 10, further including a bracket rigidly connected to a flange on the support and wherein the roller is rotationally supported by the bracket.

13. The ramp support assembly of claim 10, further including a ramp connected to the support for a rotation thereabout, the device configured to lift the ramp in a response to a rotational movement of the ramp about the support.

* * * * *